US012125392B1

(12) United States Patent
Colpitts et al.

(10) Patent No.: US 12,125,392 B1
(45) Date of Patent: Oct. 22, 2024

(54) SYSTEMS AND METHODS FOR MANAGING AERIAL VEHICLE OPERATIONS BASED ON RISK

(71) Applicant: Amazon Technologies, Inc., Seattle, WA (US)

(72) Inventors: Cameron Yujin Colpitts, Seattle, WA (US); Javier Alonso Lopez, Edmonds, WA (US); Anthony Narkawicz, Yorktown, VA (US); Gideon Barazovsky, Cambridge (GB); Alexis Fabre Ringborg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 17/183,226

(22) Filed: Feb. 23, 2021

(51) Int. Cl.
| | |
|---|---|
| *B64U 10/13* | (2023.01) |
| *G05D 1/00* | (2006.01) |
| *G06Q 10/0835* | (2023.01) |
| *G08G 5/00* | (2006.01) |
| *G08G 5/04* | (2006.01) |
| *B64C 39/02* | (2023.01) |
| *B64U 101/60* | (2023.01) |

(52) U.S. Cl.
CPC ........... *G08G 5/0039* (2013.01); *G05D 1/104* (2013.01); *G06Q 10/08355* (2013.01); *G08G 5/045* (2013.01); *B64C 39/024* (2013.01); *B64U 10/13* (2023.01); *B64U 2101/60* (2023.01)

(58) Field of Classification Search
None
See application file for complete search history.

(56) References Cited

U.S. PATENT DOCUMENTS

| | | | | |
|---|---|---|---|---|
| 9,959,772 | B2* | 5/2018 | Priest | G08G 5/0013 |
| 10,789,853 | B2* | 9/2020 | Priest | B64C 39/024 |
| 11,482,117 | B2* | 10/2022 | Sachs | G08G 5/0013 |
| 2016/0140851 | A1* | 5/2016 | Levy | G08G 5/0069 |
| | | | | 701/410 |
| 2017/0199041 | A1 | 7/2017 | Itabashi et al. | |

(Continued)

FOREIGN PATENT DOCUMENTS

CN         106347913 A  *  1/2017    ............... B65G 1/04

OTHER PUBLICATIONS

Wu et al. "Path Planning of UAVs Based on Collision Probability and Kalman Filter." IEEE Access 6 (2018): 34237-34245 (Year: 2018).*

(Continued)

*Primary Examiner* — Redhwan K Mawari
*Assistant Examiner* — Kai Wang
(74) *Attorney, Agent, or Firm* — Athorus, PLLC

(57) ABSTRACT

Described are example systems and methods for facilitating management of flight planning and operations for unmanned vehicles, such as unmanned aerial vehicles (UAVs). The described systems and methods can facilitate generation of a risk-based model that incorporates the risk presented by certain flight paths as well as the risk of collisions between concurrently operating vehicles. The described systems and methods can also facilitate determining a lowest relative total risk for planned concurrent operations. The total risk can also be compared against a risk threshold to determine whether the total risk associated with the planned operations is within an acceptable range.

19 Claims, 16 Drawing Sheets

(56) References Cited

U.S. PATENT DOCUMENTS

| | | | |
|---|---|---|---|
| 2017/0286892 A1* | 10/2017 | Studnicka | G06Q 20/4016 |
| 2018/0357909 A1* | 12/2018 | Eyhorn | G08G 5/0039 |
| 2019/0355263 A1* | 11/2019 | Priest | H04L 67/535 |
| 2020/0005651 A1* | 1/2020 | Priest | G08G 5/006 |
| 2020/0111372 A1* | 4/2020 | Yamada | G08G 5/0091 |
| 2020/0175468 A1* | 6/2020 | Tsuruta | G06Q 10/0832 |
| 2020/0219407 A1* | 7/2020 | Priest | G08G 5/0047 |
| 2020/0250998 A1* | 8/2020 | Priest | B64C 39/024 |
| 2021/0141373 A1* | 5/2021 | Bash | G08G 5/0013 |

OTHER PUBLICATIONS

Zhang et al. "Collision probability between intruding drone and commercial aircraft in airport restricted area based on collision-course trajectory planning", Transportation Research Part C: Emerging Technologies, vol. 120, 2020 (Year: 2020).*

Peter et al "A Quantitative Framework for UAV Risk Assessment", 2018 (Year: 2018).*

* cited by examiner

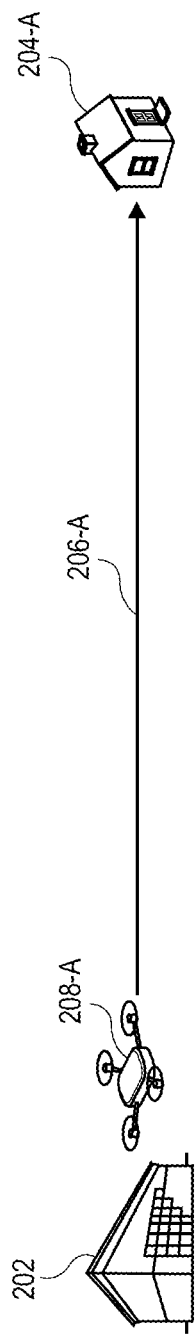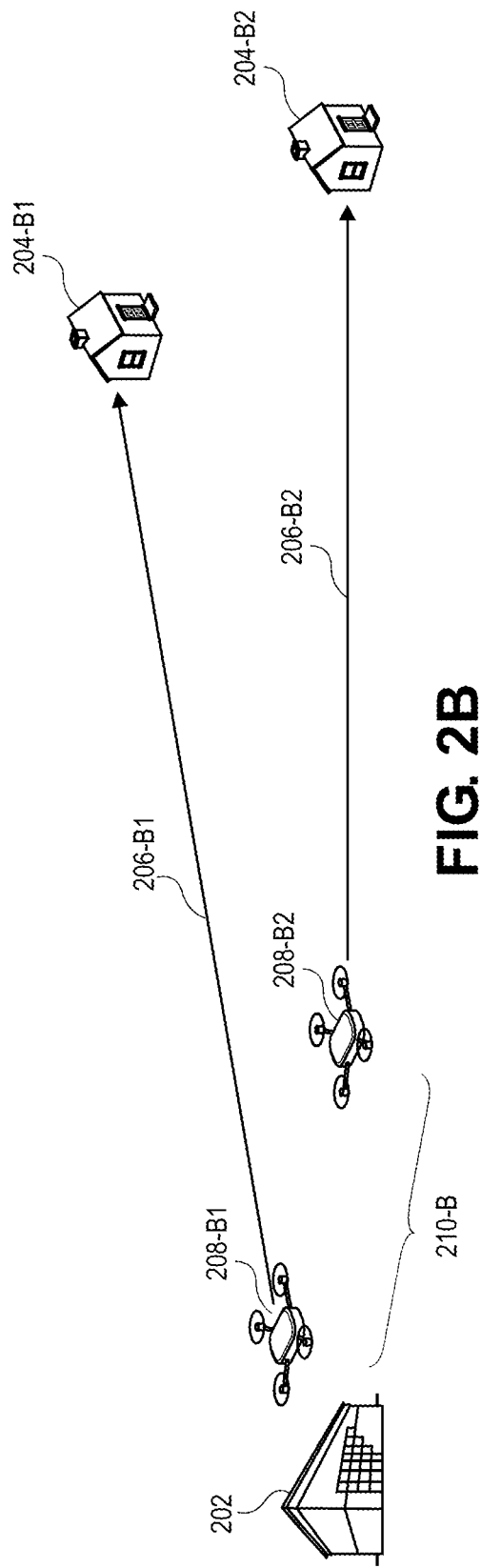
FIG. 2A
FIG. 2B

SYSTEMS AND METHODS FOR MANAGING AERIAL VEHICLE OPERATIONS BASED ON RISK

BACKGROUND

Managing safe operation of aerial vehicles can be of particular importance for operators of aerial vehicles. For example, aerial vehicle operators that employ a large fleet of aerial vehicles for performing missions such as delivering items may need to prioritize scheduling and route planning for a large number of concurrent operations being performed within a certain geographic area. Accordingly, managing the operation of a fleet of delivery vehicles, which can include scheduling and route planning for such delivery vehicles, can play a vital role in the safety and viability of performing such deliveries, especially since the geographic area in which deliveries are being performed may be constantly changing.

BRIEF DESCRIPTION OF THE DRAWINGS

FIGS. 2A-2C illustrate exemplary environments with exemplary flight paths between source locations and delivery destinations, according to exemplary embodiments of the present disclosure.

DETAILED DESCRIPTION

Figure 1A:
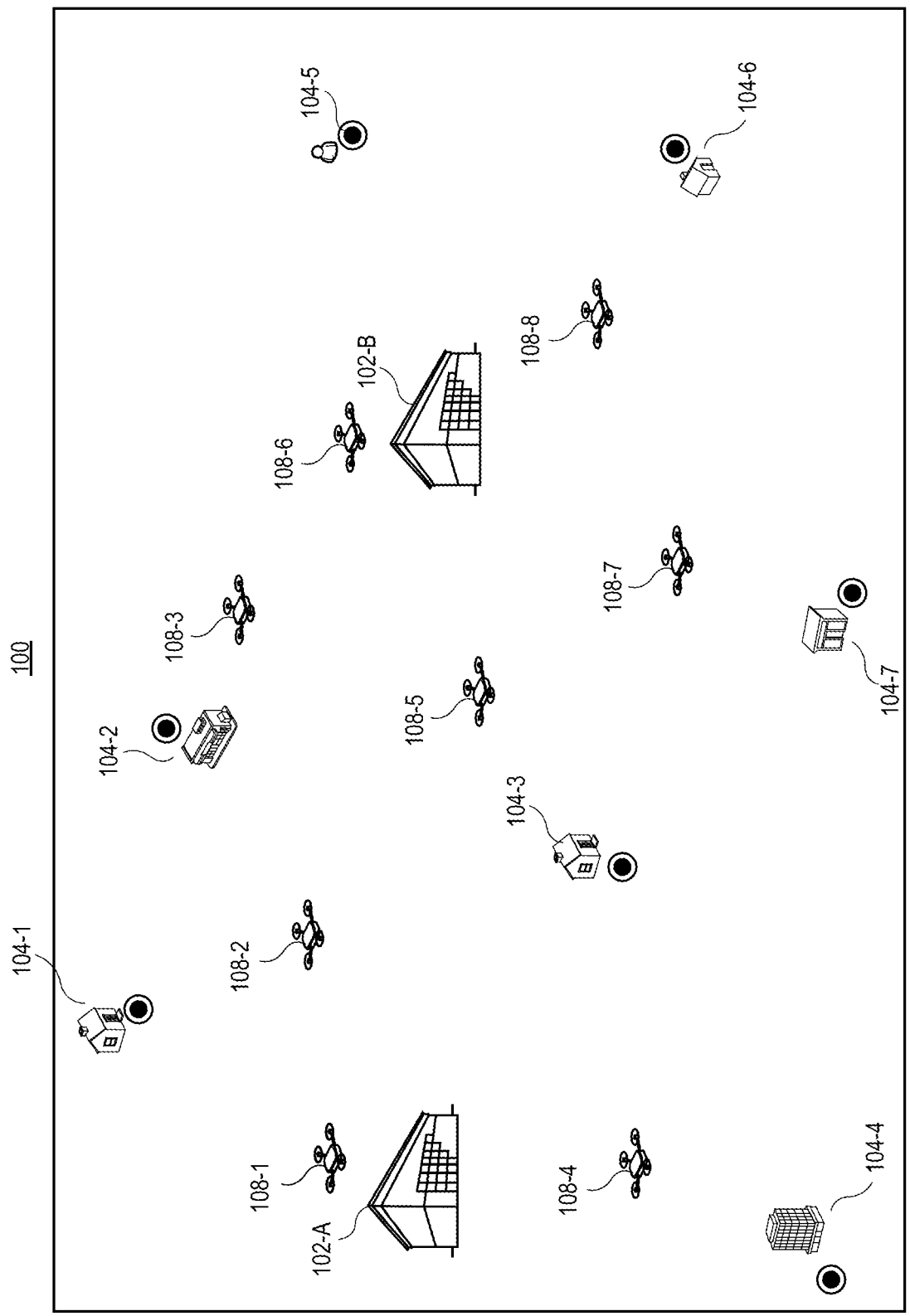
FIGS. 1A and 1B illustrate exemplary environments with source locations and delivery destinations in which aerial vehicles may perform missions, according to exemplary embodiments of the present disclosure.

As is set forth in greater detail below, embodiments of the present disclosure are generally directed to systems and methods for determining and managing flight planning and operations for unmanned vehicles, such as unmanned aerial vehicles (UAVs). For example, embodiments of the present disclosure can facilitate generation of a risk-based model for managing the operation of a fleet of UAVs. The risk-based model can facilitate determination of a total risk associated with performing one or more missions in a defined geographic area during a defined time period. According to embodiments of the present disclosure, the total risk can include a path risk associated with each of the flight paths flown by each UAV and a concurrence risk associated with the concurrent operation of multiple flights (e.g., the risk of collisions, etc.). Determination and assessment of the total risk can facilitate the selection of flight paths and the scheduling of takeoffs and landings.

For example, embodiments of the present disclosure can facilitate determining a relative minimum total risk and the concurrent operations that can achieve the relative minimum total risk. For example, flight paths and takeoff and landing schedules, etc. can be selected to present the lowest relative total risk for planned concurrent operations during a defined time period. A "flight path" can describe any aerial flight, or portion thereof, including one or more flight parameters to be followed by an aerial vehicle as it aerially navigates between a source location and a delivery destination. For example, the flight path may specify ranges or areas regarding heading, speed, altitude, coordinates, etc., and the aerial vehicle may operate within those ranges as it navigates the flight path.

According to exemplary embodiments of the present disclosure, the total risk may include an aggregate path risk, which may represent the risk associated with the various flight paths flown by the various aerial vehicles during the defined time period in the geographic area. The aggregate path risk can include an aggregation of all the path risks associated with each mission being performed during the time period in the geographic area by each aerial vehicle, where the path risk associated with each flight path can represent the risk associated with each individual mission being performed using the prescribed flight path by a single aerial vehicle. For example, for each mission that may be performed by an aerial vehicle using a defined flight path, the path risk associated with the mission can include a ground risk associated with parameters and characteristics present on the ground along the flight path during the time of the mission and a vehicle risk associated with the aerial vehicle performing the mission during the time of the mission. The ground risk can represent the probability of harming a person on the ground and can be determined in view of certain ground information representative of certain parameters and conditions present on the ground along the flight path, and the vehicle risk can represent the probability of a vehicle failure and can be determined in view of vehicle parameters, environmental conditions, flight path parameters, and the like.

According to exemplary embodiments of the present disclosure, the ground risk can consider ground information such as population density, sensitive structures (e.g., government facilities, airports, schools, facilities with hazardous materials, nuclear power plants, electrical infrastructure, telecommunications infrastructure, covered vs. uncovered spaces, etc.), etc. Ground risk can also consider whether any structures include a covered (e.g., building, etc.) space or an uncovered (e.g., park, open space, etc.) space. For example, the probability of injuring or harming a person located within a covered facility (e.g., a building, etc.) may be lower than the probability of injuring or harming a person in an uncovered area (e.g., a park or playground). Additionally, certain aspects of ground risk may vary depending on time.

For example, the risk of performing a mission over a school may be higher during the school day when compared to performing the mission over the school when school is not in session. Similarly, the risk of performing a mission over an interstate highway may increase during commuting times when more vehicles (i.e., more people) are located on the interstate highway, etc. According to certain aspects, the ground information used to determine ground risk can also include real-time information that may be representative of real-time conditions on the ground (e.g., number of cellular customers in an area, traffic conditions, emergency conditions, current and expected weather conditions, etc.).

In addition to ground risk, the path risk associated with the flight path can also include a vehicle risk. The vehicle risk can represent the probability of a vehicle failure and can be determined based on vehicle information associated with the vehicle that is anticipated to perform the mission, as well as the flight path the vehicle is anticipated to fly. For example, vehicle information can include parameters and characteristics associated with the vehicle, such as vehicle type, battery charge, battery type, weight of payload, vehicle history, environmental conditions (e.g., weather, etc.), rate of energy consumption/expenditure, time since last flight, time since last maintenance service, length of last flight, temperature of certain components, weight of payload on last flight(s), emergency handling and landing capabilities, etc. Additionally, vehicle risk can also consider the difficulty of the flight path. For example, this can include factors such as length/duration of the flight path, vehicle maneuvers (e.g., banking, climbs, descents, etc.), etc. Accordingly, vehicle risk can be vehicle-type dependent, and may vary based on vehicle type for any given flight path. Various exemplary systems and methods in connection with the determination and application of path risk are described in further detail in U.S. patent application Ser. No. 17/030,320, filed on Sep. 23, 2020, which is hereby incorporated by reference herein in its entirety.

In addition to path risk, the total risk can also include an aggregate concurrence risk. The aggregate concurrence risk can represent the risk of collision associated with the simultaneous operation of multiple vehicles during the defined time period in the geographic area. According to exemplary embodiments of the present disclosure, aggregate concurrence risk can be determined based on pairwise concurrence risk distributions for each pair of concurrently operating aerial vehicles. For example, a conformance volume for each vehicle operating in the geographic area during the time period can be determined, and the pairwise concurrence risk for each pair of vehicles can be determined. The aggregate concurrence risk can include the aggregation of the pairwise concurrence risk for each pair of vehicles operating in the geographic area during the defined time period.

Embodiments of the present disclosure can also facilitate determining a lowest relative total risk for planned concurrent operations. For example, the aggregate path risk and the aggregate concurrence risk can be optimized to obtain the lowest relative total risk for the concurrent missions to be performed during a defined time period. This may be accomplished by selecting flight paths, scheduling takeoffs and landings, specifying certain spacing between aerial vehicles, specifying certain maneuvers, and the like, such that the selected flight paths and concurrent operation of missions presents the lowest relative total risk.

According to aspects of the present disclosure, total risk can also facilitate determination of the viability of certain concurrent missions during a time period in view of a total risk threshold. For example, a total risk threshold can be established to determine a level of "acceptable" risk for any given time period. The total risk threshold can be established by law, regulations, an organization, or any considerations or combination thereof. Accordingly, it can be determined that the operation of concurrent missions during a time period having a total risk below the established total risk threshold can be performed, whereas the operation of concurrent missions during a time period having a total risk above the threshold should not be performed. In the event that the total risk for the operation of concurrent missions during a given time period exceeds the thresholds, certain measures may be employed to lower the total risk associated with the operation of the concurrent mission. For example, the flight paths may be adjusted, the takeoff and/or landing times of the vehicles may be adjusted, certain missions may be eliminated, or the like.

Such thresholds may be utilized, for example, by an e-commerce organization in determining the availability of delivery, via an aerial vehicle such as a UAV, in connection with the purchase of an item. According to one aspect of the present disclosure, as a customer is perusing items on an e-commerce platform of an e-commerce organization, after a delivery address of the customer has been determined, a source location (e.g., materials handling facility, fulfillment center, etc.) can be determined from where the item may be provided. Accordingly, based on the source location and the delivery destination of the customer, incremental total risk introduced by the addition of the mission to deliver the item can be determined to assess the viability of adding the mission in question during one or more time periods. The total risk, including the incremental total risk introduced by the additional mission, can be compared against a total risk threshold, and, if the total risk is below the total risk threshold, it can be determined that aerial delivery of the item can be performed during a given time period and an aerial delivery option may be presented to the customer.

While the examples discussed herein often refer to a fulfillment center as a source location and a customer specified location as a delivery destination, the disclosed embodiments are equally applicable to other forms or locations. In general, the source location may be any location from which an aerial transport of an item may be initiated, and a delivery destination may be any location at which delivery of the item may be completed. For example, a source location may include, but is not limited to, a ground-based fulfillment center, an aerial based fulfillment center, a water-based fulfillment center, a fulfillment center located beyond the earth's troposphere, a customer's home, a business address, etc. Likewise, a delivery destination may include, but is not limited to, a customer's home address, a geographic coordinate, an automobile (moving or stationary), a water-based vehicle (moving or stationary), a building, a park, another aerial vehicle, a location beyond the earth's troposphere, etc.

Further, although embodiments of the present disclosure are described primarily with respect to aerial vehicles, embodiments of the present disclosure can be applicable to any other types of automated vehicles. For example, embodiments of the present disclosure can be applicable to unmanned aerial vehicles, ground based vehicles, autonomous ground-based vehicles, water-based vehicles, unmanned water-based vehicles, space vehicles, etc.

FIG. 1A illustrates an exemplary environment 100 in which multiple concurrent missions may be performed by UAVs during a defined time period, according to exemplary embodiments of the present disclosure.

As shown in FIG. 1, aerial vehicles 108 may concurrently be operating in environment 100. For example, each of aerial vehicles 108-1, 108-2, 108-3, 108-4, 108-5, 108-6, 108-7, and/or 108-8 may be performing a delivery mission between source locations 102-A or 102-B and one of delivery destinations 104-1, 104-2, 104-3, 104-4, 104-5, 104-6, and 104-7. Accordingly, each of aerial vehicles 108-1, 108-2, 108-3, 108-4, 108-5, 108-6, 108-7, and/or 108-8 may have taken off from one of source locations 102-A or 102-B and may be in route to perform a delivery, or returning from performing a delivery, at one of delivery destinations 104-1, 104-2, 104-3, 104-4, 104-5, 104-6, of 104-7. According to certain aspects, source locations 102-A and 102-B can include any facility where items to be delivered may originate, such as materials handling facilities, a warehouse, a fulfillment center, a retail location, or the like, and delivery destinations 104-1, 104-2, 104-3, 104-4, 104-5, 104-6, and 104-7 can include any location to which an item may be delivered, such as a customer residence, an office, another materials handling facility, such as a warehouse, fulfillment center, retail location, etc. Embodiments of the present disclosure may be employed for any mission or operation that contemplates the concurrent operation of multiple vehicles (e.g., such as UAVs), such as surveillance, performing surveys, monitoring an area or event of interest, or the like.

Embodiments of the present disclosure may facilitate planning, management, and operation of the concurrent operation of aerial vehicles 108-1, 108-2, 108-3, 108-4, 108-5, 108-6, 108-7, and/or 108-8 in environment 100. For example, embodiments of the present disclosure can facilitate a determination of a total risk associated with the operation of multiple concurrent missions being performed by aerial vehicles 108-1, 108-2, 108-3, 108-4, 108-5, 108-6, 108-7, and/or 108-8 during the time period illustrated in FIG. 1A. The total risk may then be used to facilitate planning, scheduling, and operation of the missions being performed.

According to exemplary embodiments of the present disclosure, the total risk may include an aggregate path risk, which may represent the sum of all the path risks associated with each of the flight paths being flown by aerial vehicles 108-1, 108-2, 108-3, 108-4, 108-5, 108-6, 108-7, and/or 108-8 and an aggregate concurrence risk, which may represent a sum of all the pairwise risks of collision between aerial vehicles 108-1, 108-2, 108-3, 108-4, 108-5, 108-6, 108-7, and/or 108-8. The path risk associated with each flight path can represent the probability of causing human harm and/or the probability of a vehicle failure for each mission along the respective flight path, and concurrence risk can represent the risk of a collision between aerial vehicles.

According to exemplary embodiments of the present disclosure, the total risk can be represented as:

$$\text{total}_{risk} = \sum_{i=1}^{N} \text{path\_risk}(P_i) + \sum_{i=1}^{N} \sum_{j=i+1}^{N} \text{concurrence\_risk}(P_i, P_j) \quad (1)$$

where path_risk ($P_i$) can represent the path risk associated with flight path $P_i$ (e.g., any flight path being flowing by one or more of aerial vehicles 108) and concurrence_risk ($P_i$, $P_j$) can represent the pairwise probability of a collision between vehicles (e.g., one or more of aerial vehicles 108) operating along flight paths $P_i$ and $P_j$. Consequently, operations where the risk of collisions is zero, the second term in Equation (1) is zero and the total risk is equal to the aggregation of the path risks associated with each flight path being flown by the one or more aerial vehicles in performing missions.

Accordingly, aspects of the present disclosure can facilitate planning, management, and operation of the concurrent operation of aerial vehicles 108-1, 108-2, 108-3, 108-4, 108-5, 108-6, 108-7, and/or 108-8 in environment 100 based on the total risk associated with the concurrent operation of multiple vehicles. For example, aspects of the present disclosure can facilitate determining a relative minimum total risk for the operation of multiple concurrent flights. According to one aspect, flight paths presenting relative minima for each mission (e.g., origin and destination, etc.) can first be determined, and relative minima for the concurrence risk for concurrent operation in view of the selected flight paths can then be determined. Further relative optimization of the two terms can also be performed. For example, flight paths may be modified to further optimize concurrence risk, which may come at a cost of path risk. Accordingly, the performance of multiple concurrent missions, as shown in FIG. 1A, may represent a lowest relative total risk, as well as a total risk that is below a total risk threshold, for performing the multiple concurrent missions during the prescribed time period. This may include, for example, selection of flight paths that aerial vehicles 108-1, 108-2, 108-3, 108-4, 108-5, 108-6, 108-7, and/or 108-8 may follow, as well as the takeoff and/or landing times of aerial vehicles 108-1, 108-2, 108-3, 108-4, 108-5, 108-6, 108-7, and/or 108-8 in the performance of each respective mission. Determination and optimization of the total risk, including determination of the path risk and the concurrence risk, are described further herein in connection with FIGS. 1B, 2A-2C, 3, 4A-4C, and 8. Accordingly, the flight paths, the scheduling and timing (e.g., takeoff time, landing times, delivery times, etc.), and/or maneuvering of aerial vehicles 108-1, 108-2, 108-3, 108-4, 108-5, 108-6, 108-7, and/or 108-8 may be selected to present a lowest relative total risk associated with the performance of the multiple concurrent missions being performed by aerial vehicles 108-1, 108-2, 108-3, 108-4, 108-5, 108-6, 108-7, and/or 108-8 during the defined time period.

According to other aspects, the total risk can be used to determine the viability of concurrent operations. For example, a total risk threshold may be determined, or may have been established (e.g., by the government, an agency, the operator, etc.), to determine whether the concurrent missions may be performed. According to embodiments, a baseline total risk (e.g., of causing human harm or injury, experiencing a vehicle failure or collision, etc.) that may be deemed "acceptable" may first be determined. This may include, for example, a target statistic, such as a certain number of human injuries, vehicle failures, and/or vehicle collisions for a given unit of measure (e.g., operational time of a mission performed, number of missions performed, operation distance of a mission flown, unit of population, etc.). Based on the baseline risk, a threshold value of the total risk can be extrapolated (e.g., based on the time period being assessed, the number of missions being flown, parameters of the missions being performed, etc.) from the baseline value of the "acceptable" risk. The baseline acceptable risk may be established, for example, by law, regulation, the government, a governmental agency, or other regulatory or governing body, etc. According to certain aspects of the present disclosure, after the threshold value of total risk is determined, it may be compared against the total risk associated with planned concurrent operation of multiple missions during a defined time period to determine whether the planned concurrent operation of multiple missions can proceed as planned. Alternatively and/or in addition, the incremental change of adding one or more additional concurrent missions to a planned concurrent operation of multiple missions can be assessed to determine the viability of adding the one or more additional concurrent missions in question.

Figure 1B:
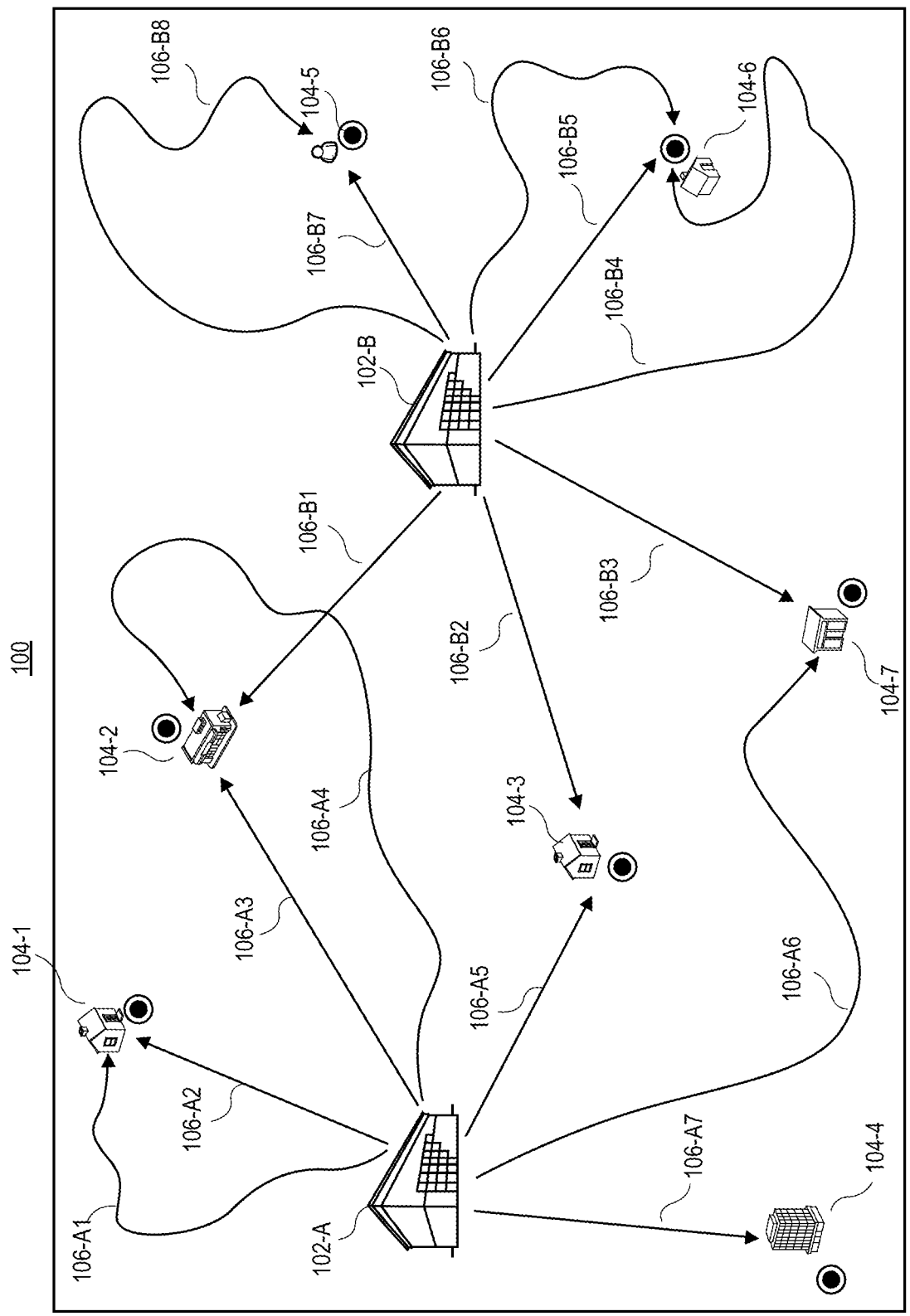

FIG. 1B illustrates exemplary flight paths 106 in exemplary environment 100 that may be flown by aerial vehicles operating in environment 100, according to exemplary embodiments of the present disclosure.

As shown in FIG. 1B, environment 100 can include flight paths 106 between source locations 102 and delivery destinations 104. In exemplary environment 100, source locations 102-A and 102-B can include any facility where items to be delivered may originate, such as materials handling facilities, a warehouse, a fulfillment center, a retail location, etc. Further, delivery destinations 104-1, 104-2, 104-3, 104-4, 104-5, 104-6, and 104-7 can include any location to which an item may be delivered, and may include a customer residence, an office, another materials handling facility, such as a warehouse, fulfillment center, retail location, etc. Flight paths 106 can represent some of the various possible flight paths between the respective source locations 102 and delivery destinations 104.

As shown in FIG. 1B, one or more flight paths 106 may be determined between one of source locations 102 and one of delivery destinations 104. According to certain aspects, flight paths for certain delivery destinations (e.g., delivery destination 104-2, 104-3, and 104-7) may include flight paths from more than one source location 102. Specifically, flight paths 106-A1, 106-A2, 106-A3, 106-A4, 106-A5, 106-A6, and 106-A7 between the source location 102-A and each respective delivery destination 104-1, 104-2, 104-3, 104-4, and 104-7 can be determined. Similarly, flight paths 106-B1, 106-B2, 106-B3, 106-B4, 106-B5, 106-B6, 106-B7, and 106-B8 between the source location 102-B and each respective delivery destination 104-2, 104-3, 104-5, 104-6, and 104-7 can be determined. Each flight path 106 may specify one or more flight parameters to be followed by an aerial vehicle as it aerially navigates between a source location 102 and a delivery destination 104, and the term "flight path," as used herein, may include any segment and/or portion of exemplary flight paths 106. For example, the flight path may specify ranges or areas regarding heading, speed, altitude, coordinates, etc., and the aerial vehicle may operate within those ranges as it navigates the flight path 106. Further, each flight path 106 may avoid prohibited airspace, restricted airspace, and/or other no-fly zones implemented and maintained by the government or private organization (e.g., military base, airport, government buildings, etc.). Each of flight paths 106-A1, 106-A2, 106-A3, 106-A4, 106-A5, 106-A6, and 106-A7 may represent flight path $P_i$ and/or $P_j$, as described above in connection with Equation (1).

For each flight path 106 shown in FIG. 1B, a path risk may be determined to ascertain a risk associated with each flight path 106 from a perspective of total risk and/or ascertain the flight path with the lowest relative total risk for performing a mission, such as delivering an item. According to embodiments of the present disclosure, the path risk associated with each flight path 106 can represent a probability of causing human harm or injury and/or experiencing a vehicle failure while the vehicle is navigating along the respective flight path 106. According to embodiments of the present disclosure, the path risk can include a ground risk, which can represent a probability of causing human harm or injury in view of conditions on the ground over which the aerial vehicle navigates while performing a mission while following the respective flight path 106, and a vehicle risk, which can represent a probability of a vehicle failure while the vehicle is performing the mission using the respective flight path 106.

Ground risk may represent the probability of causing human injury or harm and may include population density as one component in determining the ground risk associated with a flight path, as higher population densities generally present a higher probability of injuring a person should a failure occur with a vehicle. Ground risk may also include other factors, such as, for example, events affecting population density (e.g., events, time of day, etc.), sheltered/unsheltered population density (e.g., the ground risk associated with a flight path passing over unsheltered population densities may present a higher probability of injuring a person), sensitive structures and areas (e.g., a nuclear or chemical plant, a school, etc.), and the like. Vehicle risk may represent the probability of a vehicle failure, and may include factors such as flight time, flight maneuvers, vehicle history, weather, environmental factors, time since last maintenance, energy consumption, speed, changes in altitude, vehicle type, and the like. According to certain aspects of the present disclosure, the vehicle risk may be determined using a failure tree analysis.

According to exemplary embodiments of the present disclosure, each flight path can be represented as:

$$\text{path}_i(t) = [x, y, z] \quad (2)$$

where [x, y, z] can represent the latitude, longitude, and elevation of an aerial vehicle performing a mission along the flight path i at time t. Further, ground risk can be represented as:

$$\text{world\_risk}(x, y, z, t) = \frac{dP(\text{injury} \mid \text{vehicle\_failure})}{dt} \quad (3)$$

where world_risk (x, y, z, t)dt can represent the risk of causing an injury to a person (e.g., represented as a probability of injury, etc.) at the position (e.g., latitude, longitude, and altitude) defined by x, y, z, at time t. Accordingly, world_risk(x, y, z, t)dt can be represented as a four-dimensional scalar field representing the rate of ground risk accumulation. Although ground risk can vary as a function of time (e.g., transient effects such as social gatherings, traffic, shifts in population density, etc.), over short periods of time, the ground risk function can be assumed to be fixed with respect to time t, as significant changes in population density and other ground risk factors (e.g., location of sensitive structures, etc.) are unlikely to occur over short periods of time. Accordingly, over short periods of time, world_risk(x, y, z, t)dt can be understood to be a three-dimensional scalar field based on location (e.g., latitude, longitude, and altitude).

Similarly, vehicle risk, which can represent the probability of a vehicle failure, can be represented as:

$$\text{vehicle\_risk}(\text{path}_i(t)) = \frac{dP(\text{vehicle\_failure})}{dt} \quad (4)$$

where vehicle_risk (path$_i$(t)) dt can represent the risk of a vehicle failure (e.g., represented as a probability of failure, etc.) at time t as the vehicle navigates along path$_i$. The risk of vehicle failure can be based on flight time (e.g., increases as a function of flight time, etc.), rate of energy expenditure, velocity of the vehicle, time since last maintenance, maneuvers required of the vehicle as defined by the flight path, etc. Accordingly, the same flight paths may present different vehicle risk (and different total cumulative risk) based on how the flight path is flown (e.g., velocity, etc.) and which vehicle operates on the flight path. Further, since vehicle risk generally increases as the length of flight increases, factors encountered earlier in flight may present a lower risk when compared to factors encountered later in flight. For example, the vehicle risk presented by performing a certain maneuver early on in flight may be lower than the vehicle risk presented by performing the same maneuver under the same conditions later during the same flight.

Based on the ground risk and the vehicle risk, a path risk associated with each respective flight path can be determined, which can be represented as:

$$\text{path\_risk}_i = \int_{t=0}^{t=\text{mission\_len}} \text{vehicle\_risk}(\text{path}_i(t)) * \text{world\_risk}(\text{path}_i(t))dt \quad (5)$$

where path_risk$_i$ can represent the path risk (e.g., represented as a probability of injury to a person and a probability of vehicle failure, etc.) associated with flight path i. Flight path i can be any one of flights paths 106 as shown in FIG. 1B, or any other flight path between a source location and a delivery destination for which a mission is being planned, and the number of flight paths i is preferably unbounded.

The combination of the ground risk and the vehicle risk can correspond to the path risk associated with each flight path. The path risk can facilitate generation of a risk-weighted model of the environment in which the vehicle will operate. For example, the risk-weighted model can be represented as a four-dimensional (e.g., latitude, longitude, altitude, and time) weighted graph, where the weight can represent the incremental path risk of the vehicle operating in the environment as it travels from a first point in an environment (e.g., in environment 100) to a second point in the environment (e.g., environment 100). Accordingly, as a vehicle travels between various points in the environment, a relative optimal total path risk can be incrementally determined. For example, a stepwise search algorithm approach such as the A* algorithm, Dijkstra's Algorithm, a greedy best first search algorithm, gradient descent algorithm, etc. can be applied to determine a relative optimal flight path having the lowest relative associated path risk. Various exemplary systems and methods in connection with the determination and application of path risk are described in further detail in U.S. patent application Ser. No. 17/030,320, filed on Sep. 23, 2020, which is hereby incorporated by reference herein in its entirety.

Figure 2C:
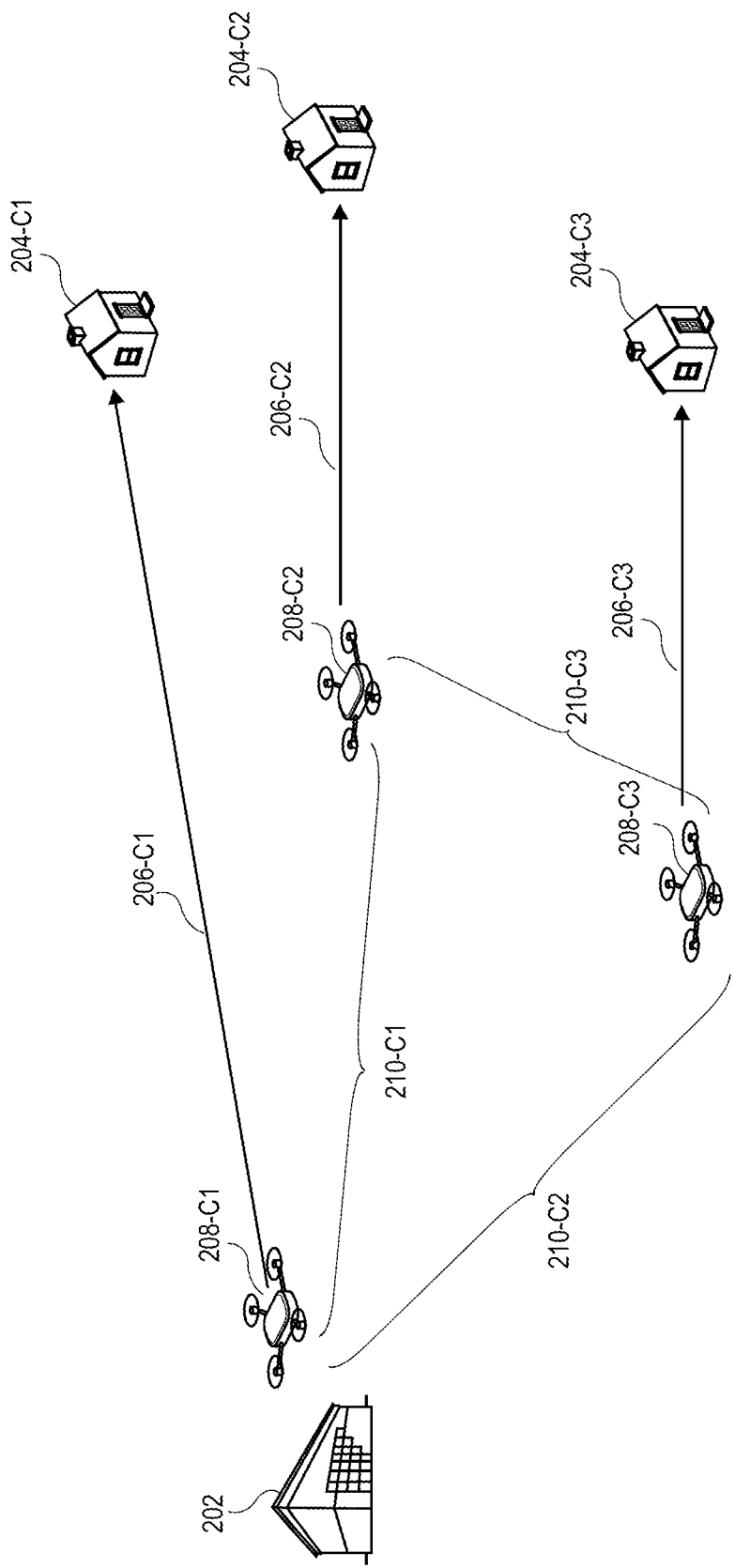

FIGS. 2A-2C illustrate the exemplary operation of one or more aerial vehicles 208 in performing missions, according to exemplary embodiments of the present disclosure. FIG. 2A shows aerial vehicle 208-A performing a mission alone, whereas FIGS. 2B and 2C illustrate aerial vehicles 208-B1, 208-B2, 208-C1, 208-C2, and 208-C3 performing concurrent missions.

FIG. 2A depicts an implementation where an aerial vehicle is performing a mission in an environment and at a time where no aerial vehicles are concurrently performing a mission. As shown in FIG. 2A, aerial vehicle 208-A may be performing a mission, such as delivering one or more items from source location 202 to delivery destination 204-A as it navigates along flight path 206-A from source location 202 to delivery destination 204-A.

In the illustrated implementation, embodiments of the present disclosure can facilitate a determination of the total risk associated with aerial vehicle 208-A performing the individual mission of delivering an item from source location 202 to delivery destination 204-A as it navigates along flight path 206-A. According to embodiments of the present disclosure, the total risk associated with performance of the mission by aerial vehicle 208-A can include a path risk associated the performance of the mission by aerial vehicle 208-A as it navigates along flight path 206-A and a concurrence risk associated with a risk of aerial vehicle 208-A colliding with another aerial vehicle.

As shown in FIG. 2A, while aerial vehicle 208-A is performing a mission in the environment, there are no other aerial vehicles operating in the environment concurrently with aerial vehicle 208-A. Accordingly, the probability that aerial vehicle 208-A may collide with another aerial vehicle is zero in this scenario. Therefore, determination of the total risk associated with the mission being performed by aerial vehicle 208-A may be reduced to a determination of the aggregate path risk. In this scenario, since there is only one aerial vehicle (e.g., aerial vehicle 208-A) performing an individual mission, the path risk associated with the performance of the mission by aerial vehicle 208-A as it navigates along flight path 206-A may be the aggregate path risk. According to aspects of the present disclosure, the path risk associated with the performance of the mission by aerial vehicle 208-A as it navigates along flight path 206-A may include a ground risk and a vehicle risk. The ground risk can represent a probability of causing human harm or injury in view of conditions on the ground over which aerial vehicle 208-A navigates while performing a mission while following flight path 206-A, and the vehicle risk can represent a probability of a vehicle failure while aerial vehicle 208-A is performing a mission while following flight path 206-A.

According to aspects of the present disclosure, a relative lowest total risk may be determined in connection with the scenario illustrated in FIG. 2A. To determine a relative minimum of the total risk of the implementation shown in FIG. 2A, a relative optimization of the path risk associated with the mission being performed by aerial vehicle 208-A may be determined. For example, flight path 206-A may be chosen such that it passes over areas presenting a relative minimal risk and/or includes maneuvers (e.g., climbing in altitude, etc.) to mitigate risks presented by higher risk areas. Accordingly, the combination of the ground risk and the vehicle risk can facilitate generation of a risk-weighted model of the environment in which aerial vehicle 208-A may operate. For example, the risk-weighted model can be represented as a four-dimensional (e.g., latitude, longitude, altitude, and time) weighted graph, where the weight can represent the incremental path risk of the vehicle operating in the environment as it travels from a first point to a second point while performing a mission, as shown in FIG. 2A. Accordingly, as aerial vehicle 208-A travels between source location 202 to delivery destination 204-A along flight path 206-A, a relative optimal total path risk can be incrementally determined. For example, a stepwise search algorithm approach such as the A* algorithm, Dijkstra's Algorithm, a greedy best first search algorithm, gradient descent algorithm, etc. can be applied to determine a relative optimal flight path having the lowest relative associated path risk.

According to exemplary embodiments of the present disclosure, the total risk can also be compared to a threshold total risk to determine the viability of the concurrent operation of multiple missions as currently planned. For example, a total risk below the threshold total risk would indicate that the planned operations are able to proceed as planned, whereas a total risk above the threshold total risk would indicate that the planned operations are unable to proceed as planned and may require certain modifications to lower the total risk to a value beneath the threshold risk.

FIGS. 2B and 2C illustrate the exemplary operation of more than one aerial vehicle 208 in performing missions, according to exemplary embodiments of the present disclosure. FIGS. 2B and 2C illustrate aerial vehicles 208-B1 and 208-B2, and 208-C1, 208-C2, and 208-C3, respectively, performing concurrent missions.

As shown in FIG. 2B, aerial vehicle 208-B1 may be performing a mission, such as delivering one or more items from source location 202 to delivery destination 204-B1, as it navigates along flight path 206-B1 from source location 202 to delivery destination 204-B1. Concurrently, aerial vehicle 208-B2 may also be performing a concurrent mission, such as delivering one or more items from source location 202 to delivery destination 204-B2, as it navigates along flight path 206-B2 from source location 202 to delivery destination 204-B2. As shown in FIG. 2B, aerial vehicles 208-B1 and 208-B2 may be positioned and/or oriented by separation 210-B.

In the illustrated implementation, embodiments of the present disclosure can facilitate a determination of the total risk associated with the performance of the concurrent missions by aerial vehicles 208-B1 and 208-B2. For example, aerial vehicles 208-B1 and 208-B2 may be delivering an item from source location 202 to delivery destinations 204-B1 and 204-B2, respectively, as they navigate along flight paths 206-B1 and 206-B2, respectively. According to embodiments of the present disclosure, the total risk associated with performance of the missions by aerial vehicles 208-B1 and 208-B2 can include an aggregate path risk associated with performance of the missions by aerial vehicles 208-B1 and 208-B2 as they navigate along flight paths 206-B1 and 206-B2, respectively, and an aggregate concurrence risk associated with a risk of aerial vehicles (e.g., aerial vehicles 208-B1 and 208-B2) colliding with another aerial vehicle (e.g., aerial vehicles 208-B1 and 208-B2).

Determination of the path risk associated with the implementation shown in FIG. 2B may be similar to the determination of the path risk of the implementation shown in FIG. 2A. However, unlike in the implementation shown in FIG. 2A where the aggregate path risk may be reduced to the path risk associated with the performance of the single mission by aerial vehicle 208-A as it navigates along flight path 206-A, in the implementation shown in FIG. 2B, the aggregate path risk may include the aggregation of the path risks associated with the performance of each mission by aerial vehicles 208-B1 and 208-B2 as they navigate along flight paths 206-B1 and 206-B2, respectively. Each of the path risks associated with aerial vehicles 208-B1 and 208-B2 as they navigate along flight paths 206-B1 and 206-B2, respectively, may be determined in a manner similar to the implementation shown in FIG. 2A. For example, each of the path risks associated with the performance of the mission by aerial vehicles 208-B1 and 208-B2 as they navigate along flight paths 206-B1 and 206-B2, respectively, may include a ground risk and a vehicle risk. The ground risk can represent a probability of causing human harm or injury in view of conditions on the ground over which aerial vehicles 208-B1 and 208-B2 navigate while performing their respective missions while following flight paths 206-B1 and 206-B2, and the vehicle risk can represent the probability of a vehicle failure while aerial vehicles 208-B1 and 208-B2 are performing their respective missions while following flight paths 206-B1 and 206-B2. Accordingly, after a path risk associated with aerial vehicle 208-B1 and a path risk associated with aerial vehicle 208-B2 have been determined, the path risks may be summed to determine the aggregate path risk associated with the performance of the missions by aerial vehicles 208-B1 and 208-B2.

In addition to the determination of the aggregate path risk, the aggregate concurrence risk may also be determined in the determination of the total risk. The aggregate concurrence risk may represent the risk of collision between aerial vehicles performing multiple concurrent missions. In the scenario shown in FIG. 2B, since there is only a single pair of aerial vehicles (e.g., aerial vehicles 208-B1 and 208-B2) operating concurrently, the aggregate concurrence risk may be reduced to the pairwise concurrence risk associated with aerial vehicles 208-B1 and 208-B2. According to exemplary embodiments of the present disclosure, the concurrence risk can be determined, for example, using pairwise conformance volumes. For example, conformance volumes for each aerial vehicle (e.g., aerial vehicle 208-B1 and 208-B2) may first be determined. Each respective conformance volume can represent the volume that each respective aerial vehicle may occupy along a flight path at a given time. After the conformance volumes for each aerial vehicle have been determined, a pairwise risk of collision for each pair of concurrently operating aerial vehicles may be determined, and the aggregate concurrence risk may be the sum of the pairwise risks of collision for every pair of concurrently operating aerial vehicles. In the implementation illustrated in FIG. 2B, this may include the pairwise risk of collision for aerial vehicles 208-B1 and 208-B2. Determination of concurrence risk is described in further detail herein in connection with FIGS. 3 and 4A-4C.

The total risk associated with the concurrent operation of the multiple aerial vehicles can then be determined by summing the aggregate path risk with the aggregate concurrence risk. According to exemplary embodiments of the present disclosure, the total risk can be compared against a threshold total risk to determine the viability of the concurrent operation of multiple missions as currently planned. For example, if the total risk is below the threshold total risk, the planned operations may proceed as planned. Conversely, if the total risk is above the threshold total risk, the planned operations may require certain modifications to proceed. For example, certain missions may be removed, certain flight paths may be modified, takeoff times may be modified to increase a separation between the aerial vehicles, or the like. These changes may lower the path risk associated with one or more of the flight paths and/or the concurrence risk associated with one or more pairs of aerial vehicles.

Alternatively and/or in addition, embodiments of the present disclosure can facilitate determining a relative optimized total risk. This can facilitate planning, management, and scheduling of concurrent operation of multiple missions during a defined time period. Flight paths presenting relative minima for each mission can first be determined, and relative minima for the concurrence risk for concurrent operation in view of the selected flight paths can then be determined. For example, flight paths 206-B1 and/or 206-B2 may be chosen such that it passes over areas presenting a relative minimal risk and/or includes maneuvers (e.g., climbing in altitude, etc.) to mitigate risks presented by higher risk areas. Additionally, takeoff times, maneuvering, velocities, separation, etc. of the aerial vehicles (e.g., aerial vehicles 208-B1 and/or 208-B2) may be chosen to where the conformance volumes associated with the aerial vehicles over the entire respective flight paths do not intersect and/or overlap so as to reduce the concurrence risk associated with the concurrent operation of the missions.

Further relative optimization of the two terms can also be performed. For example, flight paths (e.g., flight paths 206-B1 and/or 206-B2) may be modified to further optimize concurrence risk. However, modification of the flight paths may come at a cost of the aggregate concurrence risk and/or the path risks presented by the flight paths that may have been modified. Accordingly, the concurrence risks and/or path risks may need to be re-assessed in view of the modifications to the flight paths. In the event that the modification of the flight path decreases concurrence risk but increases total risk (e.g., in view of the increase in path risk), other modifications may be introduced to the flight paths, such as scheduling of takeoffs and/or landings, separation of the aerial vehicles, etc. to determine concurrent operations that present a lower total risk. Modifying operational parameters to determine a relative optimization of concurrence risk (and total risk) is described in further detail herein in connection with FIGS. 3 and 4A-4C.

The implementation illustrated in FIG. 2C is similar to the implementation shown in FIG. 2B. However, as shown in FIG. 2C, three aerial vehicles (e.g., aerial vehicles 208-C1, 208-C2, and 208-C3) may be performing three respective missions, such as delivering one or more items from source location 202 to delivery destinations 204-C1, 204-C2, and 204-C3, as they navigate along flight paths 206-C1, 206-C2, and 206-C3. As shown in FIG. 2C, aerial vehicles 208-C1 and 208-C2 may be positioned and/or oriented by separation 210-C1, aerial vehicles 208-C1 and 208-C3 may be positioned and/or oriented by separation 210-C2, and aerial vehicles 208-C2 and 208-C3 may be positioned and/or oriented by separation 210-C3.

In the illustrated implementation, embodiments of the present disclosure can facilitate a determination of the total risk associated with the performance of the concurrent missions by aerial vehicles 208-C1, 208-C2, and 208-C3. For example, each of aerial vehicles 208-C1, 208-C2, and 208-C3 may be delivering an item from source location 202 to delivery destinations 204-C1, 204-C2, and 204-C3, respectively, as they navigate along flight paths 206-C1, 206-C2, and 206-C3, respectively. According to embodiments of the present disclosure, the total risk associated with performance of the missions by aerial vehicles 208-C1, 208-C2, and 208-C3 can include an aggregate path risk associated with performance of the mission by aerial vehicles 208-C1, 208-C2, and 208-C3 as they navigate along flight paths 206-C1, 206-C2, and 206-C3, respectively, and an aggregate concurrence risk associated with a risk of aerial vehicles (e.g., aerial vehicles 208-C1, 208-C2, and 208-C3) colliding with another aerial vehicle (e.g., aerial vehicles 208-C1, 208-C2, and 208-C3).

Determination of the path risk associated with the implementation shown in FIG. 2C may be similar to the determination of the path risk of the implementation shown in FIGS. 2A and 2B. However, unlike in the implementation shown in FIG. 2A where the aggregate path risk may be reduced to the path risk associated with the performance of the single mission by aerial vehicle 208-A as it navigates along flight path 206-A, in the implementation shown in FIG. 2C, the aggregate path risk may include the aggregation of the path risks associated with the performance of each mission by aerial vehicles 208-C1, 208-C2, and 208-C3 as they navigate along flight paths 206-C1, 206-C2, and 206-C3, respectively. Each of the path risks associated with aerial vehicles 208-C1, 208-C2, and 208-C3 as they navigate along flight paths 206-C1, 206-C2, and 206-C3, respectively, may be determined in a manner similar to the implementation shown in FIGS. 2A and 2B. For example, each of the path risks associated with the performance of the mission by aerial vehicles 208-C1, 208-C2, and 208-C3 as they navigate along flight paths 206-C1, 206-C2, and 206-C3, respectively, may include a ground risk and a vehicle risk. The ground risk can represent a probability of causing human harm or injury in view of conditions on the ground over which aerial vehicles 208-C1, 208-C2, and 208-C3 navigate while performing their respective missions while following flight paths 206-C1, 206-C2, and 206-C3, and the vehicle risk can represent the probability of a vehicle failure while aerial vehicles 208-C1, 208-C2, and 208-C3 are performing their respective missions while following flight paths 206-C1, 206-C2, and 206-C3. Accordingly, after a path risk associated with each of aerial vehicles 208-C1, 208-C2, and 208-C3 has been determined, the respective path risks can be combined to determine the aggregate path risk associated with the performance of the missions by aerial vehicles 208-C1, 208-C2, and 208-C3.

In addition to the determination of the aggregate path risk, an aggregate concurrence risk may also be determined in the determination of the total risk. The aggregate concurrence risk may represent the risk of collision between aerial vehicles performing multiple concurrent missions. In the scenario shown in FIG. 2C, this may represent the risk of collision between aerial vehicles 208-C1, 208-C2, and 208-C3. According to exemplary embodiments of the present disclosure, the concurrence risk can be determined, for example, using pairwise conformance volumes. For example, conformance volumes for each aerial vehicle (e.g., aerial vehicle 208-C1, 208-C2, and 208-C3) may be determined. Each respective conformance volume can represent the volume that each respective aerial vehicle may occupy along a flight path at a given time. After the conformance volume for each aerial vehicle has been determined, a pairwise risk of collision for each pair of concurrently operating aerial vehicles may be determined. In the implementation shown in FIG. 2C, this may include the pairwise risk of collision associated with aerial vehicles 208-C1 and 208-C2, the pairwise risk of collision associated with aerial vehicles 208-C1 and 208-C3, and the pairwise risk of collision associated with aerial vehicles 208-C2 and 208-C3. Accordingly, and the aggregate concurrence risk may be the sum of the pairwise risks of collision for every pair of concurrently operating aerial vehicles. In the implementation illustrated in FIG. 2C, this may be the sum of the pairwise risk of collision associated with aerial vehicles 208-C1 and 208-C2, the pairwise risk of collision associated with aerial vehicles 208-C1 and 208-C3, and the pairwise risk of collision associated with aerial vehicles 208-C2 and 208-C3. Determination of the aggregate concurrence risk can be expanded to implementations employing any number of concurrently operating aerial vehicles. Determination of concurrence risk is described in further detail herein in connection with FIGS. 3 and 4A-4C.

Total risk associated with the concurrent operation of the multiple aerial vehicles can then be determined by summing the aggregate path risk with the aggregate concurrence risk. According to exemplary embodiments of the present disclosure, the total risk can be compared against a threshold total risk to determine the viability of the concurrent operation of multiple missions as currently planned. For example, if the total risk is below the threshold total risk, the planned operations may proceed as planned. Conversely, if the total risk is above the threshold total risk, the planned operations may require certain modifications to proceed. For example, certain missions may be removed, certain flight paths may be modified, takeoff times may be modified to increase a separation between the aerial vehicles, or the like. These changes may lower the path risk associated with one or more of the flight paths and/or the concurrence risk associated with one or more pairs of aerial vehicles.

Alternatively and/or in addition, embodiments of the present disclosure can facilitate determining a relative optimized total risk. This can facilitate planning, management, and scheduling of concurrent operation of multiple missions during a defined time period. Flight paths presenting relative minima for each mission can first be determined, and relative minima for the concurrence risk for concurrent operation in view of the selected flight paths can then be determined. For example, flight paths 206-C1, 206-C2, and/or 206-C3 may be chosen such that it passes over areas presenting a relative minimal risk and/or includes maneuvers (e.g., climbing in altitude, etc.) to mitigate risks presented by higher risk areas. Additionally, takeoff times, maneuvering, velocities, separation, etc. of the aerial vehicles (e.g., aerial vehicles 208-C1, 208-C2, and/or 208-C3) may be chosen to where the conformance volumes associated with the aerial vehicles over the entire respective flight paths do not intersect and/or overlap so as to reduce the concurrence risk associated with the concurrent operation of the missions.

Further relative optimization of the two terms can also be performed. For example, flight paths (e.g., flight paths 206-C1, 206-C2, and/or 206-C3) may be modified to further optimize concurrence risk. However, modification of the flight paths may come at a cost of the aggregate concurrence risk and/or path risks presented by the flight paths that may have been modified. Accordingly, the concurrence risks and/or path risks may need to be re-assessed in view of the modifications to the flight paths. In the event that the modification of the flight path decreases concurrence risk but increases total risk (e.g., in view of the increase in path risk), other modifications may be introduced to the flight paths, scheduling of takeoffs and/or landings, separation of the aerial vehicles, or the like to determine concurrent operations that present a lower total risk. Modifying operational parameters to determine a relative optimization of concurrence risk (and total risk) is described in further detail herein in connection with FIGS. 3 and 4A-4C.

Figure 3:
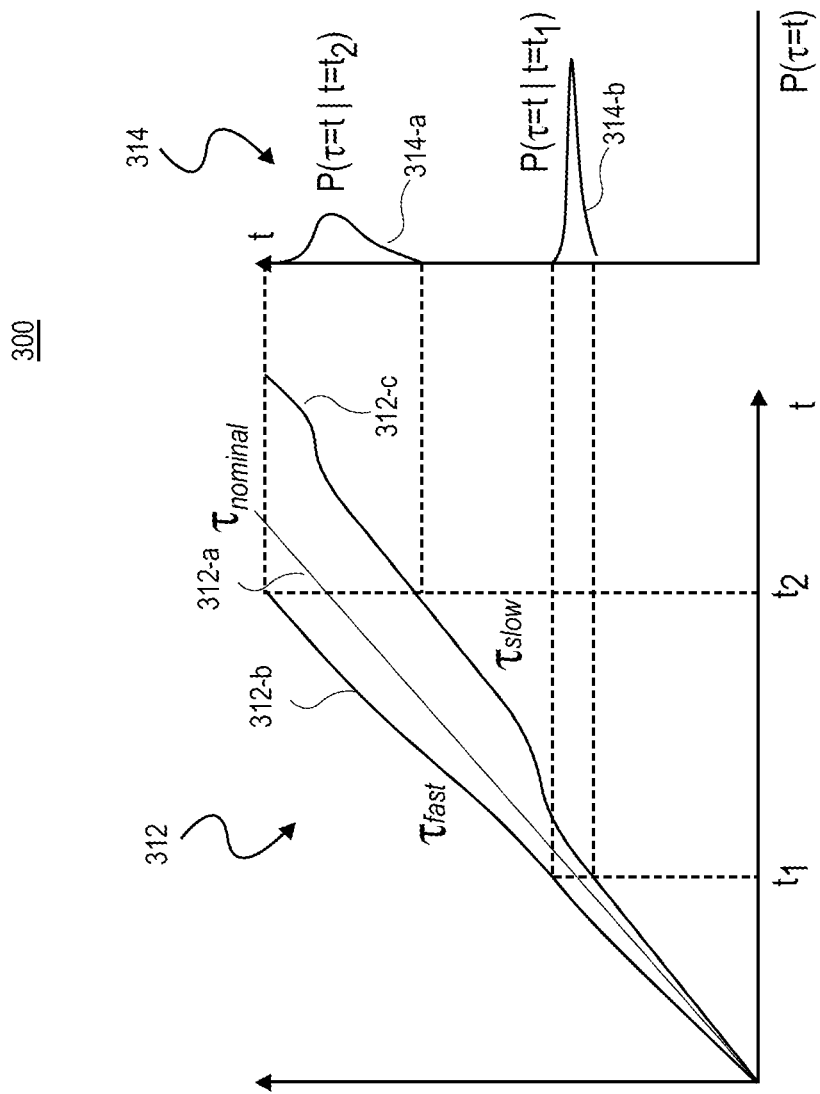
FIG. 3 illustrates an exemplary conformance volume, according to exemplary embodiments of the present disclosure.

FIG. 3 is a graphical representation of an exemplary conformance volume distribution 300, according to exemplary embodiments of the present disclosure.

FIG. 3 is an illustration of an exemplary conformance volume distribution 300. Conformance volume distribution 300 may include conformance volume 312 and exemplary conformance probability distribution 314, according to exemplary embodiments of the present disclosure. Conformance volume 312 may represent a volume that an aerial vehicle (e.g., any of aerial vehicles 208) may occupy as it navigates along a flight path P(t) over time t. As shown in FIG. 3, conformance volume 312 may expand as an aerial vehicle navigates along a flight path. For example, as a mission progresses, uncertainties affecting the performance of the mission may cause a temporal expansion in conformance volume 312, which may be expressed as τ=f(t). The temporal expansion t may be bounded by fast temporal expansion bound 312-b associated with $\tau_{fast}$ and slow temporal expansion bound 312-c associated with $\tau_{slow}$. Uncertainties that may cause the temporal expansion of conformance volume 312 may include, for example, weather conditions (e.g., wind, precipitation, etc.), power source conditions (e.g., battery, etc.), sensor performance, unexpected maneuvering (e.g., obstacle avoidance, etc.), and the like. Accordingly, conformance volume 312 illustrates nominal path 312-a associated with a nominal temporal expansion $\tau_{nominal}$. Alternatively, in a simpler model, a uniform distribution may also be applied.

As shown in FIG. 3, conformance volume 312 may be translated to conformance probabilistic model 314. Conformance probabilistic model 314 may represent the probability that the aerial vehicle may occupy a certain volume at time/as it navigates along path P(t). Accordingly, conformance probability distribution 314-a may represent the probability of the volume that may be occupied by an aerial vehicle at time $t_2$ as it navigates along path P(t), and conformance probability distribution 314-b may represent the probability of the volume that may be occupied by an aerial vehicle at time $t_1$ as it navigates along path P(t). As illustrated in FIG. 3, conformance probability distributions 314-a and 314-b may be bounded by temporal expansion of conformance volume 312 at times $t_1$ and $t_2$, respectively. Further, it can be seen in FIG. 3 that the variance associated with conformance probability distribution 314-b, which is associated with an earlier time ($t_1$) during the mission of the aerial vehicle, is smaller than the variance associated with conformance probability distribution 314-a, which is associated with a time ($t_2$) later during the mission of the aerial vehicle. Accordingly, the difference in the variance may be attributable to the temporal expansion at each respective time (e.g., less temporal expansion results in a smaller variance and a higher likelihood that the aerial vehicle may occupy the specified volume at that point in time).

According to exemplary embodiments of the present disclosure, conformance volume probability distributions (e.g., conformance probability distributions 314) may be determined for each concurrent mission to be performed. The conformance volume probability distributions can then be used to determine a concurrence risk of collision associated with the performance of the concurrent missions. For example, since these conformance volume probability distributions provide a probabilistic indicator of where the respective aerial vehicle is likely to be positioned, an overlap of any two conformance volumes probability distributions may indicate an increased risk that the two respective aerial vehicles may collide.

According to aspects of the present disclosure, the conformance volume probability distribution can be represented as:

$$CV(t)=CV(P(t)) \qquad (6)$$

where CV(t) may represent the conformance volume probability distribution for a path P(t). Using the conformance volume probability distributions, the pairwise risk of collision associated with two aerial vehicles navigating along paths $P_1(t)$ and $P_2(t)$ may be represented as:

$$\text{conformance\_collision\_risk}=\int CV(P_1(t))*CV(P_2(t))dt \qquad (7)$$

Although determining the concurrence risk of collision for two paths may be simple, as the number of concurrent missions increases, determination of the concurrence risk of collision may become computationally prohibitive. For example, as the number of concurrent missions extends into the thousands and millions, determination of the pairwise risk of collision for each pair of missions may be computationally prohibitive. Accordingly, embodiments of the present disclosure may also provide a lookup table to simplify the computation. For example, it may be assumed that the probability of collision associated with a pair of aerial vehicles having a given relative state (e.g., a relative positioning/separation and navigating at a given relative velocity) may be similar to pairs of aerial vehicles having a similar relative state (e.g., a relative positioning/separation and relative velocities). Accordingly, the probability of collision for a pair of aerial vehicles at various relative positions/separations and relative velocities can be determined and stored in a lookup table. Utilizing the lookup table, the pairwise conformance volume risk of collisions over the length of $P_1(t)$ and $P_2(t)$ being navigated by two aerial vehicles can be represented as:

$$\text{conformance\_collision\_risk} = \sum_{t=0}^{T} \text{lookup}(X(P_1(t)) - X(P_2(t)), V(P_1(t)) - V(P_2(t))) \quad (8)$$

where $X(P_1(t))-X(P_2(t))$ can represent the relative positioning/separation of the aerial vehicles at time t and $V(P_1(t))-V(P_2(t))$ can represent the relative velocity of the aerial vehicles at time t.

In view of the above and as described herein, an aggregate concurrence risk of collision can be determined based on the pairwise risk of collisions for each pair of concurrently operating aerial vehicles. For example, for N concurrent operational paths, the aggregate concurrence risk may be represented as:

$$\text{aggr\_concurrence\_risk} = \sum_{i=1}^{N} \sum_{j=i+1}^{N} \text{conformance\_collision\_risk}(P_i, P_j) \quad (9)$$

where conformance_collision_risk ($P_i$, $P_j$) can represent the pairwise probability of a collision between vehicles (e.g., one or more of aerial vehicles 108) operating along flight paths $P_i$ and $P_j$.

Exemplary embodiments of the present disclosure can also facilitate determining a relative optimized aggregate concurrence risk. For example, in view of the determination of concurrence volumes and pairwise concurrence risk, scheduling of takeoff and/or landing times of the aerial vehicles may be adjusted, flight paths along which the aerial vehicles navigate in performing their respective missions may also be adjusted, certain missions may be eliminated or substituted with alternate missions that present a lower relative concurrence risk. For example, a solution can be sought where no overlap between any conformance volumes is present. This can facilitate planning, management, and scheduling of concurrent operation of multiple missions during a defined time period.

Figure 4A:
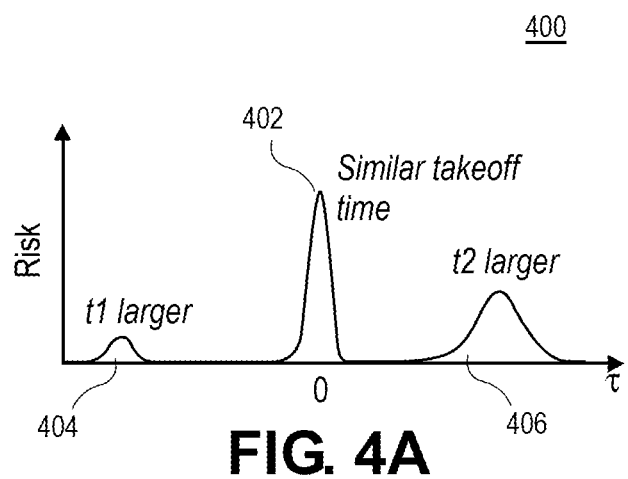
FIGS. 4A-4C illustrate exemplary pairwise concurrence risk distributions, according to exemplary embodiments of the present disclosure.
Figure 4B:
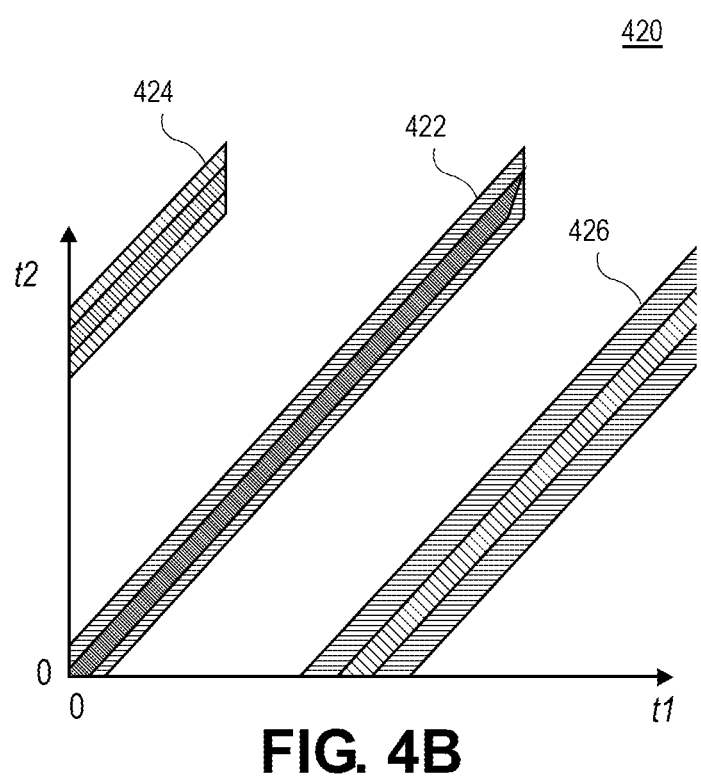
Figure 4C:
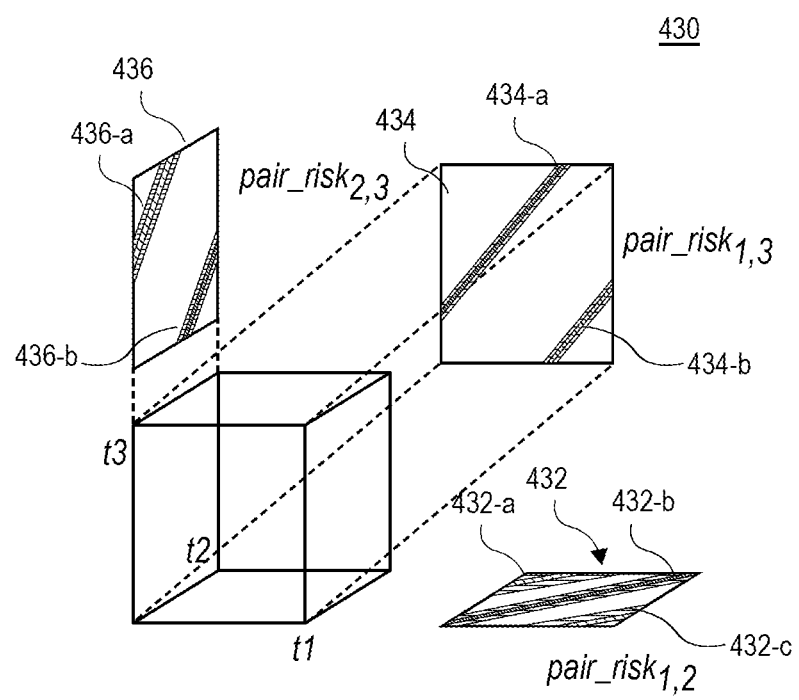

FIGS. 4A-4C illustrate exemplary risk distributions 400, 420, and 430, in accordance with exemplary embodiments of the present disclosure. According to certain aspects, the risk distributions shown in FIGS. 4A-4C may be utilized in the determination of a relative optimization of the aggregate concurrence risk.

FIG. 4A shows an exemplary risk distribution 400 associated with the takeoff of two aerial vehicles that may be performing concurrent missions. In the implementation illustrated in FIG. 4A, a first aerial vehicle may takeoff at time $t_1$ and a second aerial vehicle may takeoff at time $t_2$, and τ may represent a difference between the time $t_1$ and time $t_2$ (i.e., τ=$t_2$−$t_1$). Accordingly, FIG. 4A illustrates a concurrence risk of collision of two aerial vehicles based on the difference in their respective takeoff times. As shown in FIG. 4A, in instances where the difference between takeoff times is relatively small (e.g., close to 0), the risk of collision may be relatively high, as indicated by mode 402. Predictably, aerial vehicles that takeoff at times separated by a small interval will likely be in close proximity to each other, increasing the risk of a collision between the two aerial vehicles. Accordingly, this may correspond to situations where, in view of the close takeoff times, the conformance volume distributions associated with the two aerial vehicles intersect and/or overlap, resulting in an increased risk of collision.

Similarly, modes 404 and 406 may also correspond to situations in which, because of the takeoff times of the aerial vehicles, the aerial vehicles may come in close proximity such that their conformance volumes probability distributions may intersect. For example, mode 404 may correspond to an instance where the takeoff times of the aerial vehicles are scheduled such that the first aerial vehicle may be returning from performing its mission at a time close to a time that the second aerial vehicle is taking off. Accordingly, the conformance volume distribution associated with the first aerial vehicle's return path may intersect and/or overlap with the conformance volume distribution associated with the second aerial vehicle's outbound path, thereby presenting an increased concurrence risk of collision.

As with mode 404, mode 406 may also correspond to a situation that is the inverse of the situation encountered in connection with mode 404. For example, mode 406 may correspond to an instance where the takeoff times of the aerial vehicles are scheduled such that the second aerial vehicle is returning from performing its mission at a time close to a time that the first aerial vehicle is taking off. Accordingly, the conformance volume distribution associated with the second aerial vehicle's return path may intersect and/or overlap with the conformance volume distribution associated with the first aerial vehicle's outbound path, thereby presenting an increased concurrence risk of collision.

FIG. 4B shows a graphical representation of an exemplary concurrence risk distribution 420, according to embodiments of the present disclosure.

As shown in FIG. 4B, concurrence risk distribution 420 may correspond to risk distribution 400 illustrated in FIG. 4A and may present a two-dimensional concurrence risk of collision based on the takeoff times time $t_1$ and time $t_2$ of the two aerial vehicles. Accordingly, each point in concurrence risk distribution 420 may present a concurrence risk of collision based on the takeoff times of the two aerial vehicles. As shown in FIG. 4B, shaded areas 422, 424, and 426 may correspond to modes 402, 404, and 406 of FIG. 4A, respectively, and may represent an intersection and/or overlap of conformance volumes associated with the two aerial vehicles, which may indicate a close proximity of the aerial vehicles, thereby resulting in an increased concurrence risk of collision. Additionally, the intensity of the shading in shaded area 422, 424, and 426 may indicate the relative level of concurrence risk of collisions.

Consequently, the unshaded portions of concurrence risk distribution 420 may correspond to takeoff times that do not present an intersection of the conformance volumes associated with the two aerial vehicles. Accordingly, based on concurrence risk distribution 420, a relative optimization of the concurrence risk associated with the two aerial vehicles may include any pair of takeoff times that provides an unshaded result within concurrence risk distribution 420.

In implementations where concurrence risk distribution 420 does not include any unshaded areas, determining a relative optimization of total risk may be more involved. For example, a pair of takeoff times may be selected that yields a relative concurrence risk of collision (e.g., a shaded area having the lowest relative least intensity of shading). After selection of the takeoff times, the paths may be examined to identify the instance(s) where the conformance volumes associated with the two missions intersect. The flight paths may then be adjusted to deconflict the instances where the conformance volumes intersect. For example, the paths may be spatially adjusted, takeoff times may be adjusted, holding/loiter patterns may be introduced, or the like. However, adjustment of the flight paths may increase the concurrence risks and/or the path risks presented by the adjusted flight paths. Accordingly, after the flight paths have been adjusted to deconflict the intersection of the conformance volumes, total risk may need to be reassessed in view of the change in concurrence risk and/or path risk. Alternatively and/or in addition, a four-dimensional graph of the entire environment where concurrent missions may be operating, with each node representing a position of the aerial vehicles. From this graph, a path through the graph with the lowest relative cost to minimize the concurrence risk of collisions can be determined.

FIG. 4C shows a graphical representation of an exemplary concurrence risk distribution 430, according to embodiments of the present disclosure. Concurrence risk distribution 430 shown in FIG. 4C expands on concurrence risk distribution 420 shown in FIG. 4B.

Where FIG. 4B illustrated a two-dimensional concurrence risk distribution, FIG. 4C is an illustration of concurrence risk distribution 430, which may represent pairwise concurrence risk distributions in three dimensions. Specifically, FIG. 4C shows pairwise concurrence risk distribution 432, which may be associated with a first aerial vehicle taking-off at time $t_1$ and a second aerial vehicle taking-off at time $t_2$; pairwise concurrence risk distribution 434, which may be associated with the first aerial vehicle taking-off at time $t_1$ and a third aerial vehicle taking-off at time 13; and pairwise concurrence risk distribution 436, which may be associated with the second aerial vehicle taking-off at time $t_2$ and the third aerial vehicle taking-off at time 13. Concurrence risk distribution 432 may include shaded areas 432-a, 432-b, and 432-c, which may represent an intersection of conformance volumes, indicating an increased concurrence risk of collision. Accordingly, shaded areas 432-a, 432-b, and 434-c may correspond to temporal scenarios where the corresponding aerial vehicles may be in close proximity to each other. Similarly, concurrence risk distribution 434 may include shaded areas 434-a and 434-b, which may also represent an intersection of conformance volumes, indicating an increased concurrence risk of collision, and concurrence risk distribution 436 may include shaded areas 436-a and 436-b, which may also represent an intersection of conformance volumes, indicating an increased concurrence risk of collision. Accordingly, shaded areas 434-a, and 434-b may correspond to temporal scenarios where the corresponding aerial vehicles may be in close proximity to each other. Additionally, the intensity of the shading in shaded areas 432-a, 432-b, 432-c, 434-a, 434-b, 436-a, and 436-b may indicate the relative level of concurrence risk of collisions. According to exemplary embodiments of the present disclosure, concurrence risk distribution 430 may be expanded to N-dimensions (e.g., a temporal N-dimensional space), where N may represent the number of concurrently operating aerial vehicles.

Similar to the implementation illustrated in FIG. 4B, unshaded portions of concurrence risk distribution 430 may correspond to takeoff times that do not present an intersection of the conformance volumes associated with the three aerial vehicles. Accordingly, based on concurrence risk distribution 430, a relative optimization of the concurrence risk associated with the three aerial vehicles may include any combination of takeoff times 11, 12, and 13 that provides an unshaded result within concurrence risk distribution 430. As can be seen in FIG. 4C, this may become increasingly difficult as the number of aerial vehicles increases and concurrence risk distribution 430 is expanded into additional dimensions.

In implementations where concurrence risk distribution 430 does not include any unshaded areas (e.g., an instance of no intersection of conformance volumes), determining a relative optimization of total risk may be more involved. For example, a combination of takeoff times may be selected that yields the lowest relative concurrence risk of collision (e.g., a shaded area having the relative least intensity of shading). After selection of the takeoff times, the paths may be examined to identify the instance(s) where the conformance volumes associated with the two missions intersect. The flight paths may then be adjusted to deconflict the instances where the conformance volumes intersect. For example, the paths may be spatially adjusted, takeoff times may be adjusted, holding/loiter patterns may be introduced, or the like. However, adjustment of the flight paths may increase the concurrence risks and/or path risks presented by the adjusted flight paths. Accordingly, after the flight paths have been adjusted to deconflict the intersection of the conformance volumes, total risk may need to be reassessed in view of the change in concurrence risk and/or path risk. Alternatively and/or in addition, a four-dimensional graph of the entire environment where concurrent missions may be operating, with each node representing a position of the aerial vehicles. From this graph, a path through the graph with the lowest relative cost to minimize the concurrence risk of collisions can be determined.

Figure 5:
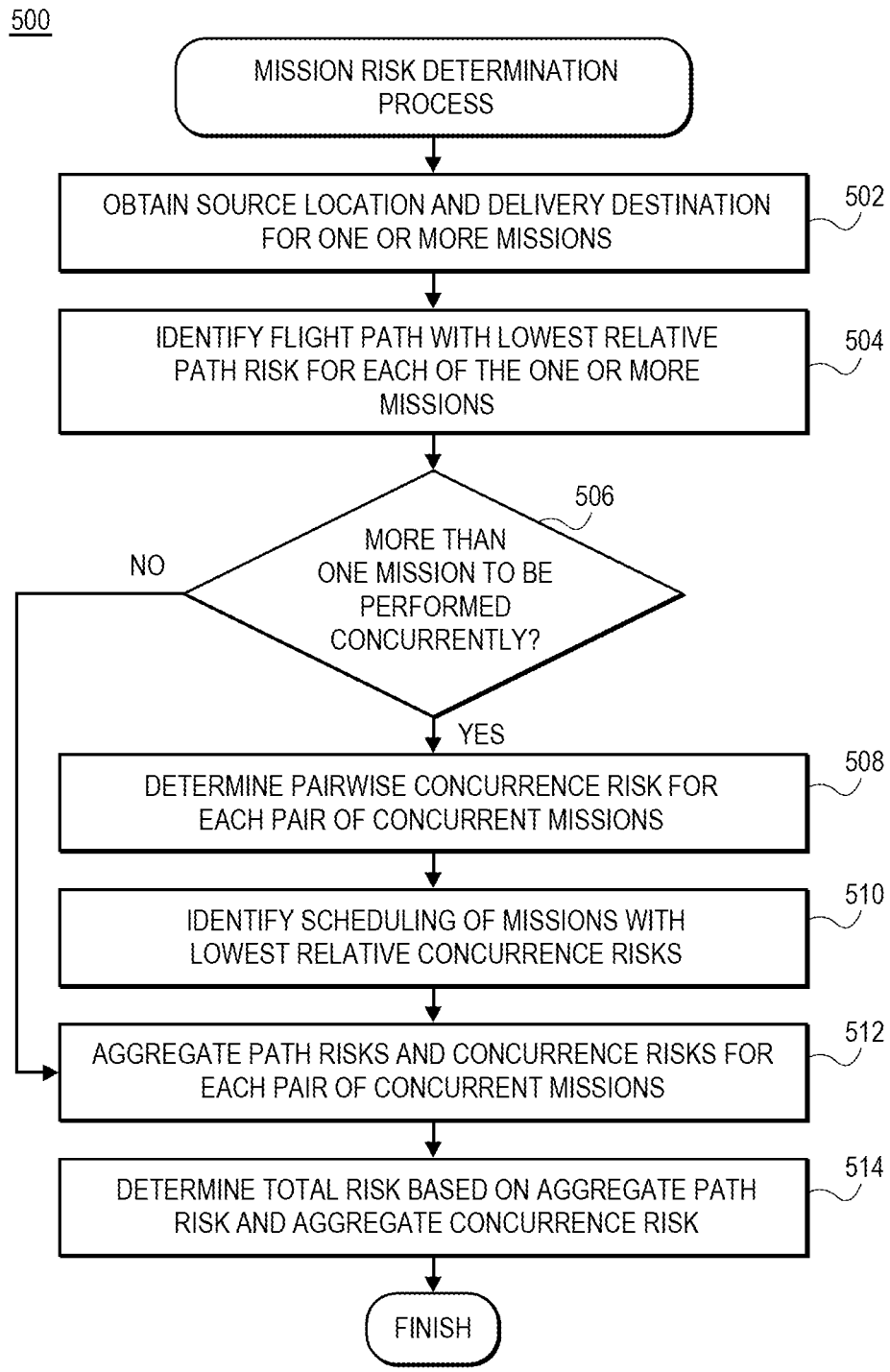
FIG. 5 is a flow diagram of an exemplary mission risk determination process, according to exemplary embodiments of the present disclosure.

FIG. 5 is a flow diagram of an exemplary mission risk determination process 500, according to exemplary embodiments of the present disclosure. The exemplary process may be utilized, for example, in the planning and management of concurrent missions.

As shown in FIG. 5, process 500 can begin with a determination of a source location (e.g., source location 102 and/or 202) and a delivery destination (e.g., delivery destination 104 and/or 202), as in step 502, for one or more missions to be performed. The source location and the delivery destination can be any two locations between which it may be desirable to perform a mission (e.g., delivery of an item, etc.) by a vehicle, such as an aerial vehicle (e.g., a UAV, etc.).

After the source location and the delivery destination have been determined, a plurality of flight paths (e.g., flight paths 106, etc.) between the source location and the delivery destination can be determined. The flight paths between the source location and delivery destination can include, for example, the shortest and most direct route between the source location and the delivery location, a route that passes over areas having the lowest relative population densities, routes that avoid restricted airspace, routes that avoid other sensitive structures, or any other route connecting the source location and the delivery destination.

For each flight path, a path risk associated with each of the flight paths may be determined, and, as in step 504, the flight path with the lowest relative path risk may be identified for each of the missions to be performed. For example, according to certain aspects of the present disclosure, the path risk associated with each flight path can include a determination of ground risk and vehicle risk, and a relative optimization of the path risk may be performed to identify a path with the lowest relative path risk among all the flight paths identified for a given mission. Determination of path risk associated with each flight path is described in further detail in connection with FIGS. 1B and 6.

In step 506, it may be determined whether any of the missions are to be performed concurrently. In the event that none of the missions are to be performed concurrently, each of the path risks associated with each of the flight paths can be aggregated to determine an aggregate path risk associated with all of the missions. In this scenario where none of the missions are being performed concurrently, the concurrence risk of collisions is zero, and the total risks for the missions may be represented by the aggregate path risk associated with each of the flight paths. According to certain aspects of the present disclosure, the total risk may be compared against a total risk threshold to ascertain whether the total risk presented by the missions is within an acceptable threshold so that the missions can proceed as planned.

Alternatively, in the event that it is determined, in step 506, that one or more of the missions are to be performed concurrently, a pairwise concurrence risk for each pair of concurrent missions may be determined, as in step 508. As described herein in connection with FIGS. 2A-2C, 3, and 4A-4C, pairwise concurrence risk may be determined based on conformance volume probability distributions associated with each mission. In step 510, the scheduling of missions (e.g., takeoff times, etc.) may be identified based on a lowest relative concurrence risk. For example, based on the number of concurrent missions being operated, the concurrence risk distributions may be projected into a multi-dimensional space (e.g., a temporal multi-dimensional space), and a solution to the multi-dimensional space (e.g., a scheduling of missions that results in no intersections between the conformance volumes associated with each mission) may be identified.

In implementations where a solution in the multi-dimensional space may not exist, a combination of takeoff times may be selected that yields the lowest relative concurrence risk. Optionally, after selection of the takeoff times, the paths may be examined to identify the instance(s) where the conformance volumes associated with the two missions intersect. The flight paths may then be adjusted to deconflict the instances where the conformance volumes intersect. For example, the paths may be spatially adjusted, or holding/loiter patterns may be introduced. However, adjustment of the flight paths may increase the path risk presented by the adjusted flight paths. Accordingly, after the flight paths have been adjusted to deconflict the intersection of the conformance volumes, total risk may need to be reassessed in view of the increased path risk. Alternatively and/or in addition, a four-dimensional graph of the entire environment where concurrent missions may be operating, with each node representing a position of the aerial vehicles. From this graph, a path through the graph with the lowest relative cost to minimize the concurrence risk of collisions can be determined.

In step 512, the path risk associated with each mission can be aggregated to yield an aggregate path risk and each pairwise concurrence risk can be aggregated to yield an aggregate concurrence risk. Next, a total risk can be determined, as in step 514, based on the aggregate path risk and the aggregate concurrence risk. According to certain aspects of the present disclosure, optionally, the total risk may be compared against a total risk threshold to ascertain whether the total risk presented by the planned missions is within an acceptable threshold so that the missions can proceed as planned.

Figure 6:
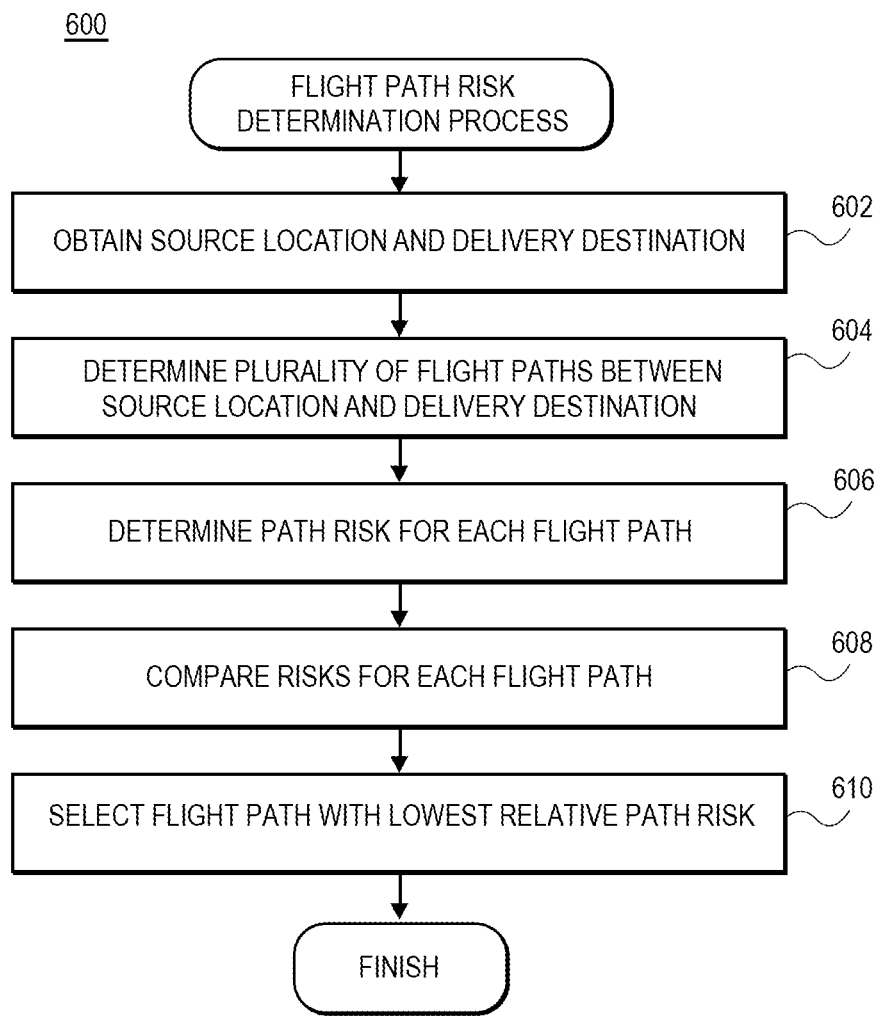
FIG. 6 is a flow diagram of an exemplary path risk determination process, according to exemplary embodiments of the present disclosure.

FIG. 6 is a flow diagram of an exemplary process 600 for determining a flight path, according to exemplary embodiments of the present disclosure. Process 600 can be used, for example, to determine a flight path (e.g., one of flight paths 106) between a source location (e.g., one of source locations 102 and/or 202) and a delivery destination (e.g., one of delivery destinations 104 and/or 204) for performing a mission, such as delivery of an item.

As shown in FIG. 6, process 600 can begin with a determination of a source location (e.g., source location 102 and/or 202) and a delivery destination (e.g., delivery destination 104 and/or 204), as in step 602. The source location and the delivery destination can be any two locations between which it may be desirable to perform a mission (e.g., delivery of an item, etc.) by a vehicle, such as an aerial vehicle (e.g., a UAV, etc.).

After the source location and the delivery destination have been determined, a plurality of flight paths (e.g., flight paths 106, etc.) between the source location and the delivery destination can be determined, as in step 604. According to embodiments, determination of the flight paths may include the determination of a plurality of flight paths between intermediary points between the source location and the delivery destination (e.g., a portion or a segment of a mission flight path between the source location and the delivery destination such that the path risk for a mission flight path can be determined incrementally. The flight paths between the source location and delivery destination can include, for example, the shortest and most direct route between the source location and the delivery location, a route that passes over areas having the lowest relative population densities, routes that avoid restricted airspace, routes that avoid other sensitive structures, or any other route connecting the source location and the delivery destination.

For each flight path, the path risk can be determined, as in step 606. Determination of the path risk for each flight path is described in further detail in connection with FIG. 1B. For example, according to certain aspects of the present disclosure, the path risk associated with each flight path can include a determination of ground risk and vehicle risk. The ground risk can represent the probability of human harm or injury and/or damage. Accordingly, ground information can be obtained, which can indicate conditions on the ground over which the flight path may pass and which can be used to determine the ground risk. For example, ground information that can be used to determine ground risk can include population density, sensitive structures and/or areas, events affecting population density (e.g., scheduled sporting events, concerts, other gatherings, time of day, etc.), etc. According to certain aspects of the present disclosure, ground information can also include real-time sensor information obtained by a vehicle as it is performing a mission along the flight path (e.g., unexpected traffic, unexpected gathering, etc.).

In addition to determining ground risk, path risk may also include vehicle risk, which may also be determined. The vehicle risk can represent the probability of experiencing a vehicle failure while the mission is being performed along the flight path. In determining the vehicle risk, vehicle information may be obtained, which can include vehicle parameters and characteristics that may be relevant in view of the flight path to be flown. For example, vehicle information that can be used to determine vehicle risk can include vehicle type, performance characteristics associated with the vehicle (e.g., propulsion, acceleration, range, payload capacity, etc.), weight of payload/item to be delivered, time of operation, time since last maintenance, length of flight, difficulty of maneuvers presented by the flight path (e.g., changes in altitude, velocity, rate of energy consumption, turns, maneuvering through tight spaces and near structures), etc. According to certain aspects of the present disclosure, vehicle information can also include real-time sensor information obtained by the vehicle as it is performing a mission along the flight path (e.g., vehicle performance, etc.).

In step 608, the path risks for each flight path determined in step 606 can be compared. For example, for a given position of an aerial vehicle performing a mission between the source location and the delivery destination, the path risk associated with each potential flight path from that position can be determined and compared against one another. In step 610, the flight path with the lowest relative path risk may be selected. Optionally, additional factors, in addition to the total cumulative risk associated with a flight path, may be considered in the determination of a flight path for performing a mission. For example, additional considerations may include number and/or type of available vehicles, length of time required to perform the mission using the flight path, economics associated with the flight path, etc. Certain flight paths may present an acceptable total cumulative risk but may include other considerations that may make the flight path unavailable or "unviable." For example, requirements of the mission may require that all deliveries be performed within 30 min, or 1 hour, etc., and certain flight paths may, although within an acceptable range or total cumulative risk, require 2 hours to complete the mission. Alternatively, the economics associated with certain flight paths (e.g., the cost of performing the mission along the flight path, etc.) may be too high, even if the total cumulative risk associated with the flight path is within an acceptable range.

Figure 7:
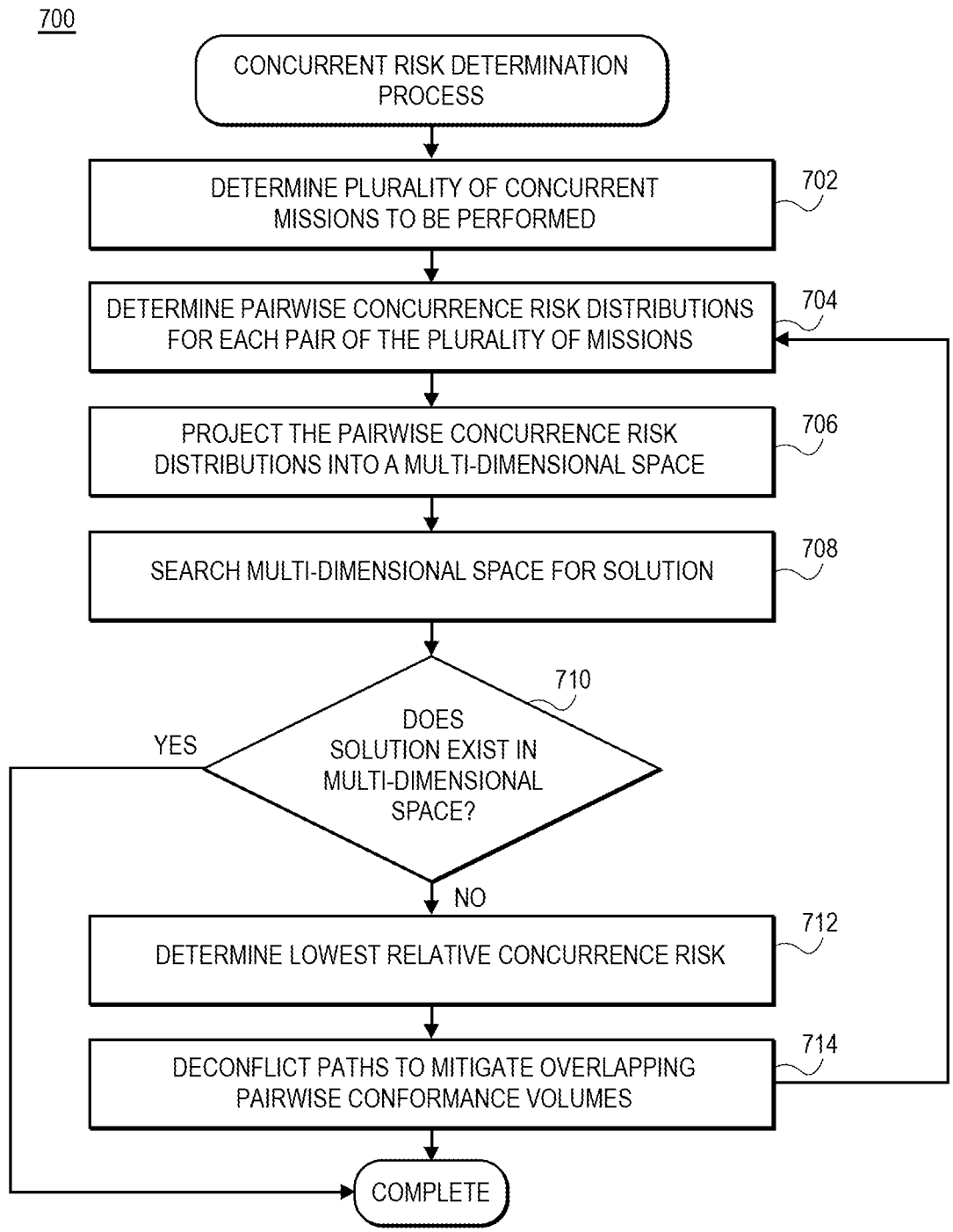
FIG. 7 is a flow diagram of an exemplary concurrent risk determination process, according to exemplary embodiments of the present disclosure.

FIG. 7 is a flow diagram of an exemplary concurrent risk determination process 700, according to exemplary embodiments of the present disclosure. The exemplary process may be utilized, for example, in the planning and management of concurrent missions.

In step 702, process 700 may begin with a determination of the concurrent missions to be performed. For example, a mission may include delivery of an item from a source location to a delivery destination via a vehicle such as an aerial vehicle and/or a UAV. Given the number of potential source locations and delivery destinations for an electronic commerce operator, the number of concurrent missions may be in excess of millions of concurrent operations.

For each of the concurrent missions identified in step 702, pairwise concurrence risk distributions may be determined for each pair of missions, in step 704. Each pairwise concurrence risk distribution may represent the probability of collision between the vehicles performing the missions, and may be based on intersections and/or overlap of conformance volumes associated with the aerial vehicles performing the missions. The intersection and/or overlap of conformance volumes may represent scenarios where the aerial vehicles performing the missions are in close proximity. Determination of conformance volumes is described in further detail herein in connection with FIGS. 3 and 4A-4C.

Next, in step 706, depending on the number of concurrent missions, each of the pairwise concurrence risk distributions may be projected into a multi-dimensional space (e.g., a temporal multi-dimensional space). For example, if only two concurrent missions are being performed, no further projection would be necessary. However, if three concurrent missions are being performed, the three pairwise concurrence risk distributions may be projected into a three-dimensional space. Consequently, for N concurrent missions, the pairwise concurrence risk distributions may be projected into an N-dimensional space.

Once the multi-dimensional space has been created using the respective pairwise concurrence risk distributions, the multi-dimensional space may be searched for a solution in the multi-dimensional space where none of the pairwise concurrence risk distributions overlap, as in step 708. Stated differently, the solution in the multi-dimensional space may be instances where there are no intersections between any of the conformance volumes associated with each mission and may present a lowest relative risk of collision. Accordingly, in step 710, it may be determined whether a solution in the multi-dimensional space exists. In the event that at least one solution exists, one solution is selected (e.g., an instance where there are no intersections between any of the conformance volumes) and the process completes.

In a scenario where no solution exists (e.g., an instance of no intersection of conformance volumes), the lowest relative concurrence risk of collision may be determined in step 712. After determination of the lowest relative concurrence risk of collision, the paths may be examined to identify the instance(s) where the conformance volumes associated with the missions intersect, as in step 714. Accordingly, the flight paths may then be adjusted to deconflict the instances where the conformance volumes intersect. For example, the paths may be spatially adjusted, takeoff times may be adjusted, holding/loiter patterns may be introduced, or the like. However, adjustment of the flight paths may increase the concurrence risks. Accordingly, after the flight paths have been adjusted to deconflict the intersection of the conformance volumes, the concurrence risk may need to be reassessed in view of the deconfliction of the flight paths. In this scenario, exemplary method 700 may return to step 704, where the pairwise concurrence risk distributions may again be determined in view of the deconflicted flight paths. Iteratively reassessing the concurrence risks may be repeated until a relative optimization of the concurrence risk has been achieved.

Alternatively and/or in addition, a four-dimensional graph of the entire environment where concurrent missions may be operating, with each node representing positions of the aerial vehicles. From this graph, a path through the graph with the lowest relative cost to minimize the concurrence risk of collisions can be determined.

Figure 8:
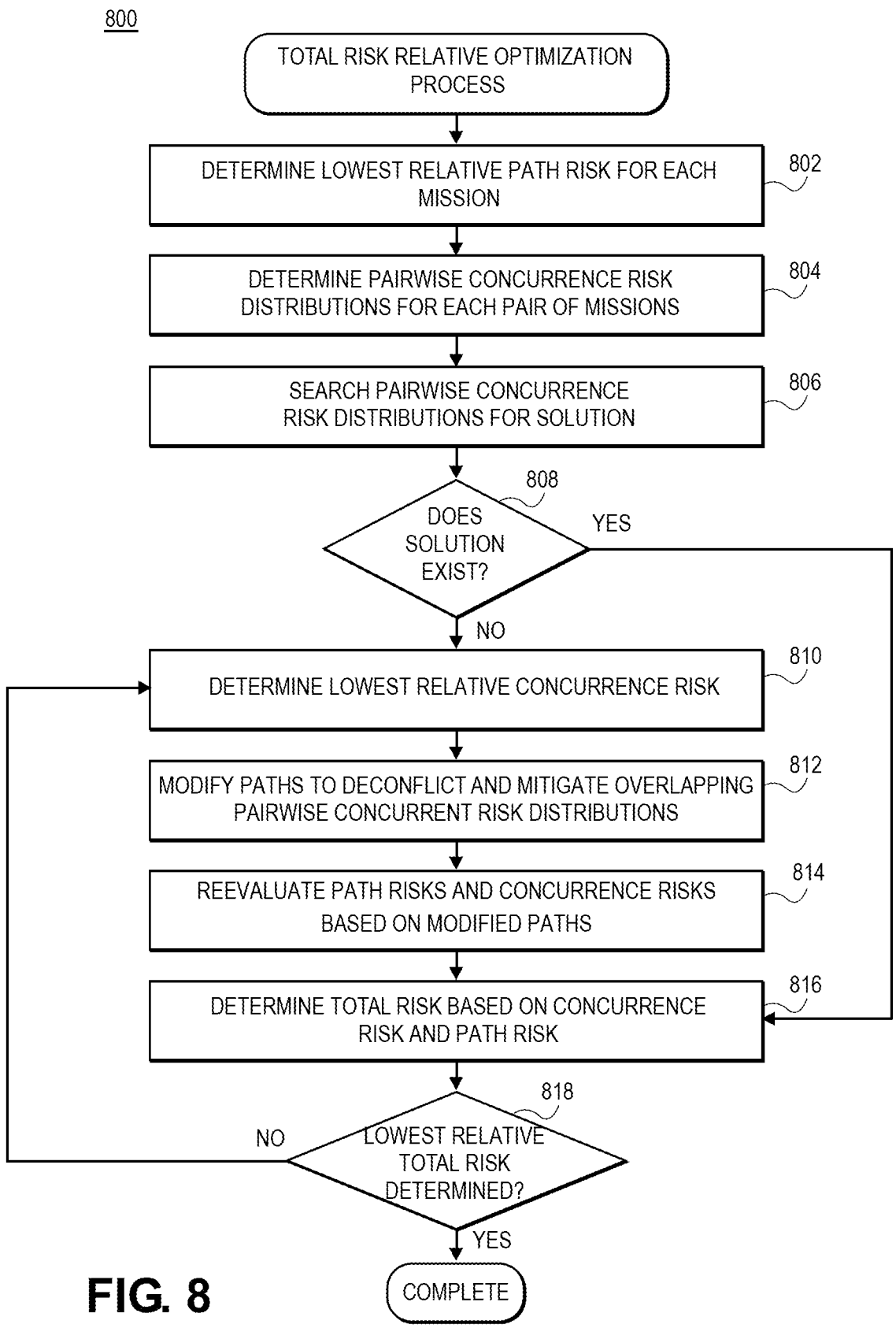
FIG. 8 is a flow diagram of an exemplary risk relative optimization process, according to exemplary embodiments of the present disclosure.

FIG. 8 is a flow diagram of an exemplary total risk relative optimization process 800, according to exemplary embodiments of the present disclosure. The exemplary process may be utilized, for example, in the planning and management of concurrent missions.

As shown in FIG. 8, process 800 can begin with a determination of the lowest relative path risk may be identified for each of the missions to be performed. For example, according to certain aspects of the present disclosure, the path risk associated with each flight path can include a determination of ground risk and vehicle risk, and a relative optimization of the path risk may be performed to identify a path with the lowest relative path risk among all the flight paths identified for a given mission. Determination of path risk associated with each flight path is described in further detail in connection with FIGS. 1B and 6.

For the concurrent missions for which a flight path having the lowest relative associated path risk has been determined, pairwise concurrence risk distributions may be determined for each pair of missions, in step 804. Each pairwise concurrence risk distribution may represent the probability of collision between the vehicles performing the missions, and may be based on intersections of conformance volumes associated with the aerial vehicles performing the missions. Determination of conformance volumes is described in further detail in connection with FIGS. 3 and 4A-4C.

Once the pairwise concurrence risk distributions have been determined, depending on the number of concurrent missions being performed, the concurrence risk distributions may be projected into a multi-dimensional space, and, in step 806, a solution to the concurrence risk distributions in the multi-dimensional space may be sought. For example, a solution to the multi-dimensional space may include instances where there are no intersections between the conformance volumes associated with each mission. Stated differently, the solution in the multi-dimensional space may be instances where there are no intersections between any of the conformance volumes associated with each mission. Accordingly, in step 808, it may be determined whether a solution in the multi-dimensional space exists. In the event that at least one solution exists, one solution is selected (e.g., an instance where there are no intersections between any of the conformance volumes) and the process proceeds to step 816, where the total risk is determined based on path risk and concurrence risk.

In implementations where a solution in the multi-dimensional space may not exist, a combination of takeoff times may be selected that yields the lowest relative concurrence risk, as in step 810. After determining the lowest relative concurrence risk, the paths may be examined to identify the instance(s) where the conformance volumes associated with the two missions intersect. The flight paths may then be adjusted, in step 812, to deconflict the instances where the conformance volumes intersect. For example, the paths may be spatially adjusted, or holding/loiter patterns may be introduced. Alternatively and/or in addition, a four-dimensional graph of the entire environment where concurrent missions may be operating, with each node representing positions of the aerial vehicles. From this graph, a path through the graph with the lowest relative cost to minimize the concurrence risk of collisions can be determined.

However, adjustment of the flight paths may increase the concurrence risks and/or path risks presented by the adjusted flight paths. Accordingly, after the flight paths have been adjusted to deconflict the intersection of the conformance volumes, the concurrence risks and/or path risks may be reevaluated in view of the modified paths, as in step 814. Upon reevaluation of the concurrence risks and/or path risks in view of the modified paths, the total risk may be determined based on path risk and concurrence risk in step 816.

However, since the modification in the paths may have affected the concurrence risks and/or path risks, which may have adversely affected the total risk, in step 818 it may be determined if the lowest relative total risk has been determined. For example, modification of the paths may have increased concurrence risks and/or path risks to such a degree that may result in a total risk that is not the relative lowest risk. Accordingly, in the event that the lowest relative risk has not been determined, process 800 may iteratively repeat modification of paths to identify a relative optimization of total risk in view of how the modified paths affect path risk and total risk.

Figure 9A:
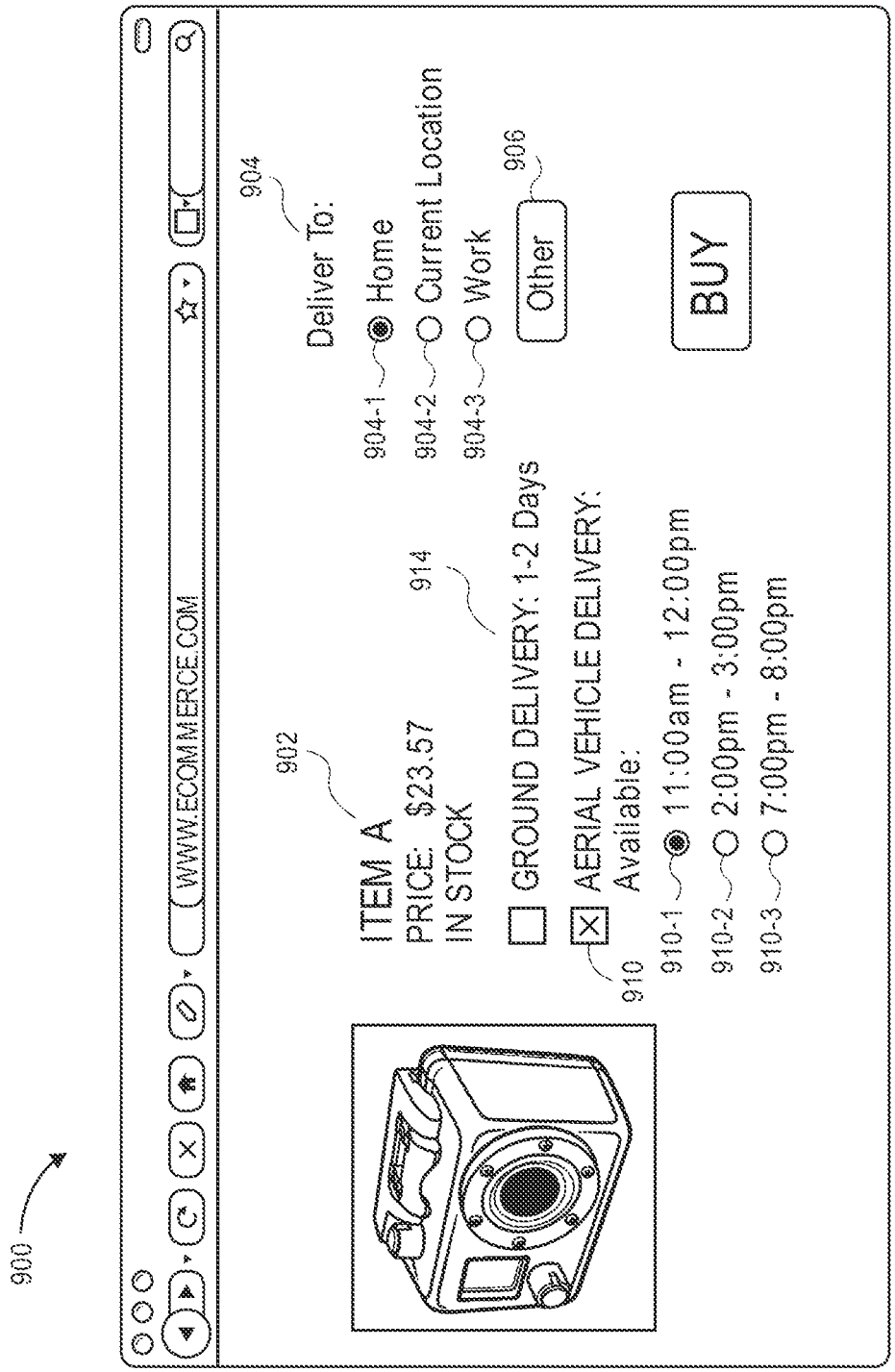
FIGS. 9A and 9B are illustrations of exemplary electronic commerce website pages, according to exemplary embodiments of the present disclosure.
Figure 9B:
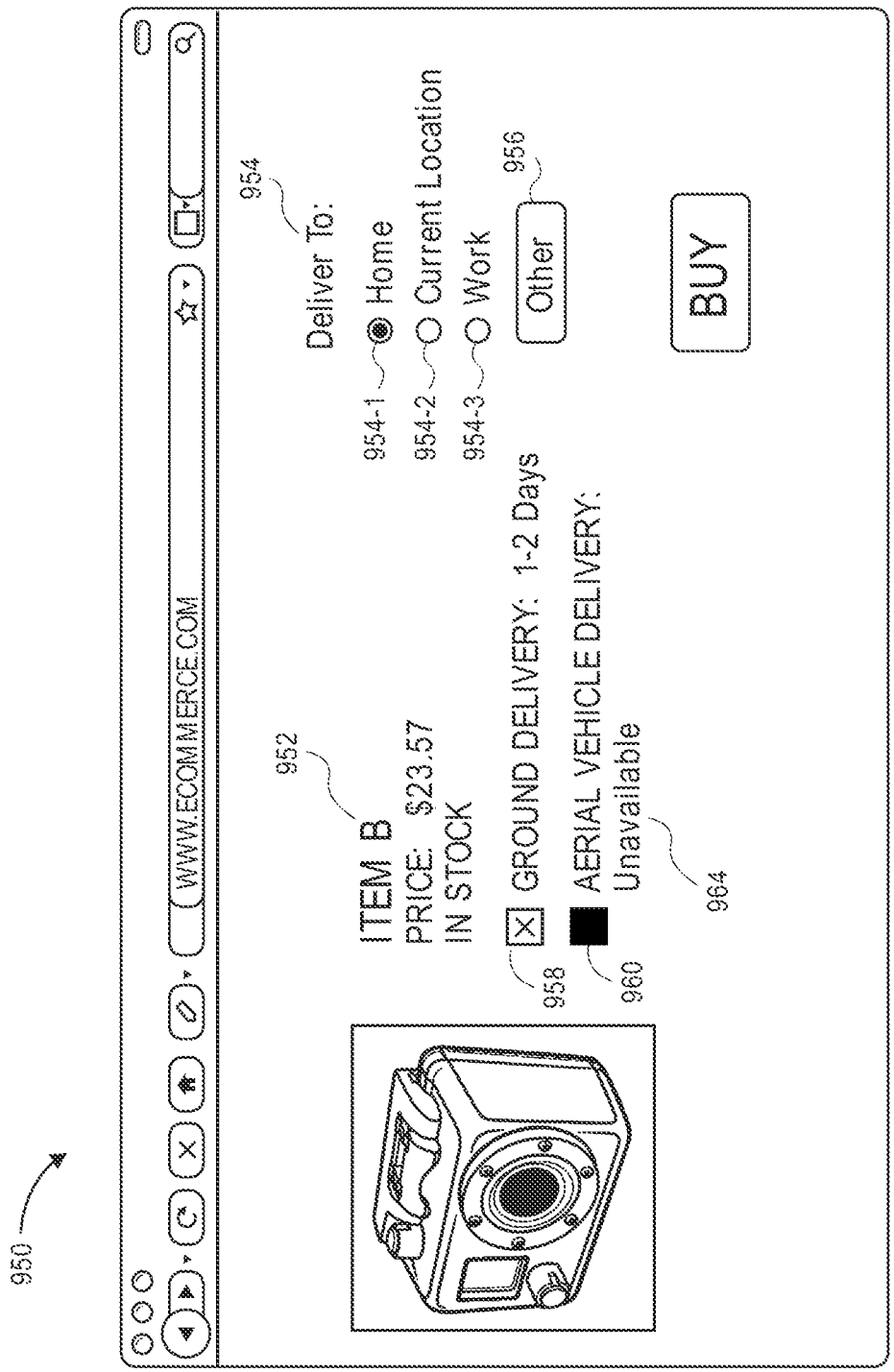

FIGS. 9A and 9B are illustrations of exemplary electronic commerce website pages 900 and 950, according to exemplary embodiments of the present disclosure.

As shown in FIG. 9A, website page 900 shows that aerial delivery is available for Item A 902, and, as shown in FIG. 9B, website page 950 shows that aerial delivery is not available for Item B 952. Pages 900 and 950 may include information about the item, such as the item price, whether the item is in stock, etc. Likewise, a user viewing the page 900 or 950 may specify a delivery destination 904 and 954. According to certain aspects of the present disclosure, the user may be recognized when the user first requests page 900 or 950 and a default or preferred delivery destination, such as Home 904-1 and 954-1, may be selected as the delivery destination. The user may select a different delivery destination, such as Current Location 904-2 and 954-2, Work 904-3 and 954-3, or specify a different delivery destination by selecting the Other control 906 and 956. The presented delivery destinations such as Home 904-1 and 954-1 and Work 904-3 and 954-3 may correspond to a specific location previously specified by the user or otherwise determined by the user. The delivery destination of Current Location 904-2 and 954-2 may be determined based on position information provided by one or more devices associated with the user. For example, current position information, such as global positioning system (GPS) data, may be provided by a portable device (e.g., cellular phone, wearable, watch, etc.) associated with the user. The position information may then be utilized as the Current Location delivery destination for the user. Finally, any other delivery location (e.g., address, coordinate, etc.) may be specified by the user.

If a default delivery address can be determined for the customer, and/or upon receiving a selection of a delivery destination, in accordance with embodiments of the present disclosure, a total cumulative risk associated with various flight paths between one or more source locations at which inventory that includes the item is maintained and the delivery destination may be determined. For example, when a user visits an electronic commerce website, the user may be identified (e.g., based on cookies, user login credentials, etc.) and a default delivery destination determined for the identified user. When the user submits a request to view a webpage for an item, such as webpage 900 or 950 for Item A 902 or 952, source locations at which the item is stored in inventory can be determined, and flight paths between those source locations and the delivery destination can be identified.

Next, an incremental risk introduced by the addition of the mission to be performed in connection with the delivery of the item may be determined. For example, the total risk presented by the current state of operations (e.g., based on an aggregate path risk and an aggregate concurrence risk) may be combined with the hypothetical introduction of this additional mission to obtain a predicted total risk in view of the additional mission. For example, a path risk associated with the mission and a concurrence risk presented by augmenting the current state of operations with the additional mission may be determined and considered. Accordingly, if the incremental risk associated with augmenting the current state of operations with the additional mission does not increase the total risk above the total risk threshold (e.g., the predicted total risk is below the total risk threshold), the availability of aerial vehicle delivery can be indicated in the displayed delivery options 914 and the radio box 910 for aerial vehicle delivery can be selected, as shown in FIG. 9A. Alternatively and/or in addition, if the incremental risk presented by the additional mission causes the total risk to exceed the total risk threshold (e.g., the predicted total risk is above the total risk threshold), aerial delivery of the item can be indicated to be unavailable as delivery option 964, and the radio box 960 may be unavailable for selection, as shown in FIG. 9B. Accordingly, radio button 958 associated with ground delivery may be selected in view of the unavailability of aerial vehicle delivery.

Optionally, according to certain aspects of the present disclosure, the incremental risk introduced by the additional mission can be considered for multiple time periods. For example, if missions are considered on an hourly basis, certain time periods may include a reduced operational state relative to others. Accordingly, it may be more likely that the incremental risk presented by the additional mission during slower operational time periods may not cause the total risk to exceed the total risk threshold and make the additional mission viable. Accordingly, in addition to presenting the option for aerial delivery, time windows during which aerial delivery may be viable (e.g., time periods during which the incremental risk presented by the additional mission does not cause the total risk to exceed the total risk threshold) may be presented as time window options 910-1, 910-2, and 910-3. Accordingly, time windows during which the incremental risk presented by the additional mission causes the total risk to exceed the total risk threshold may not be presented and/or may be presented as unavailable for selection.

According to certain embodiments of the present disclosure, other information associated with the availability of aerial delivery may also be optionally presented to the user. For example, information regarding other customers in the same geographic area who may also be viewing items that may be eligible for aerial delivery may be obtained and utilized to customize the user experience. Based on this information, certain aspects of the present disclosure can present other information associated with the availability of aerial delivery, such as, for example, how many aerial delivery slots are available before the total risk may exceed the total risk threshold thereby precluding the introduction of additional missions, a deadline for the availability of aerial delivery may be presented, the number of other customers in the same geographic area viewing items may also be presented, and the like.

Figure 10:
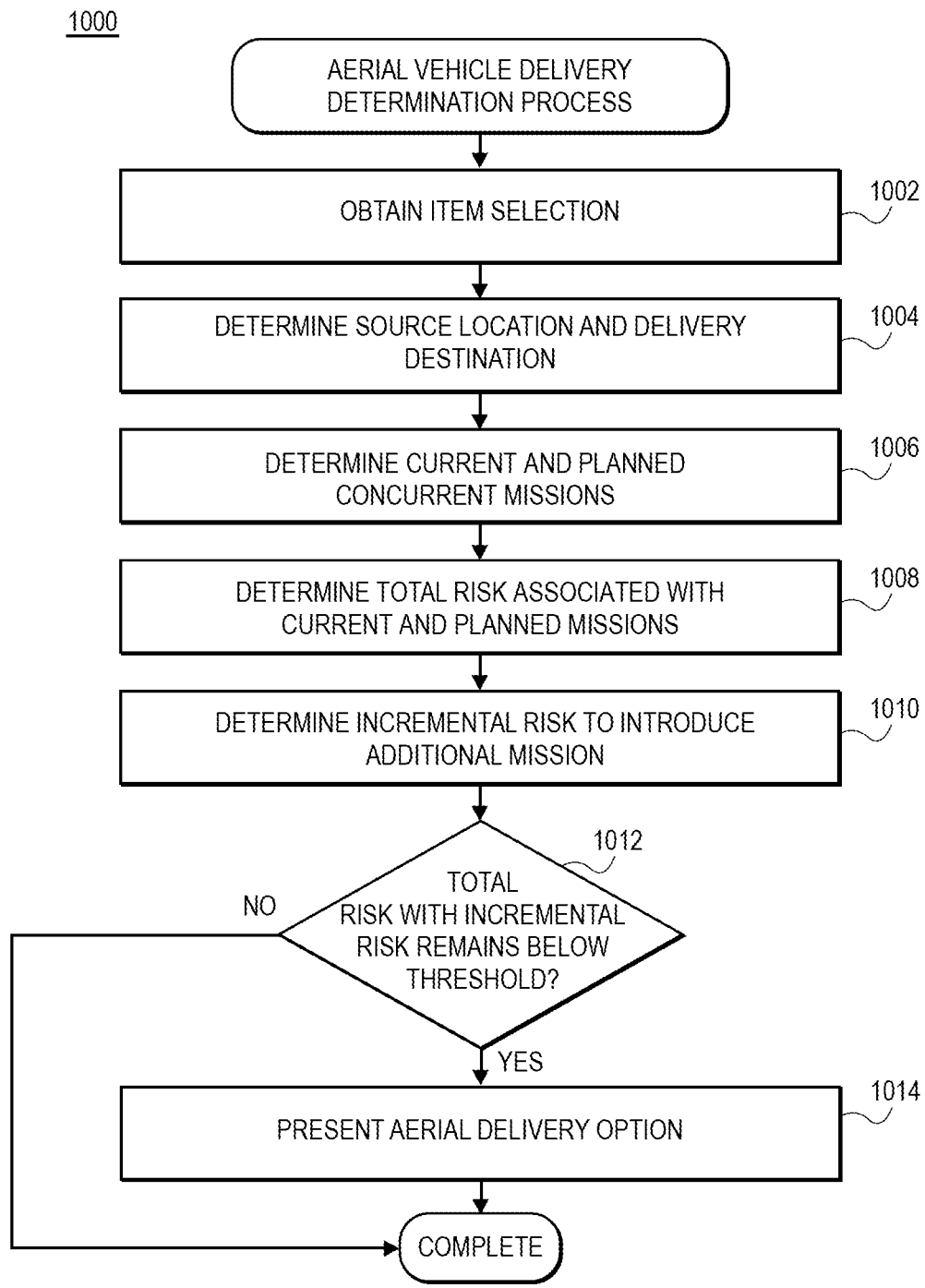
FIG. 10 is a flow diagram of an exemplary aerial vehicle delivery determination process, according to exemplary embodiments of the present disclosure.

FIG. 10 is a flow diagram of an exemplary aerial vehicle delivery option determination process 1000, in accordance with implementations of the present disclosure. The example process 1000 begins upon receipt of an item selection, as in 1002. An item selection may be, for example, a request by a user's computing device to view a web page corresponding to an item, a request from a merchant corresponding to an item of the merchant delivered by a service, etc.

Upon receipt of an item selection, one or more source locations at which the item is stored in inventory can be determined, as in step 1004. This can include, for example, any materials handling facility (e.g., warehouse, fulfillment center, retail location, etc.) from which the item may be delivered. In step 1006, the current operational state may be determined. For example, currently operating and planned missions for one or more time periods may be identified. Based on the current operational state, a total risk associated with the current operational state (e.g., currently operating and planned missions) may be determined in step 1008. As described herein, total risk may include an aggregate path risk and an aggregate concurrence risk.

In step 1010, the incremental risk presented by introducing the additional mission may be determined. For example, the path risk and the concurrence risk introduced by augmenting the current operational state with the additional mission may be considered. The incremental risk presented by the additional mission can be considered in step 1012, and it can be determined if the total risk with the incremental risk presented by the additional mission (e.g., the predicted total risk) remains below the total risk threshold. In the event the predicted risk (with the additional mission) exceeds the threshold, the process completes. Alternatively, if the predicted total risk (with the additional mission) remains below the total risk threshold, the aerial delivery option may be presented to the user, as in step 1014.

Figure 11:
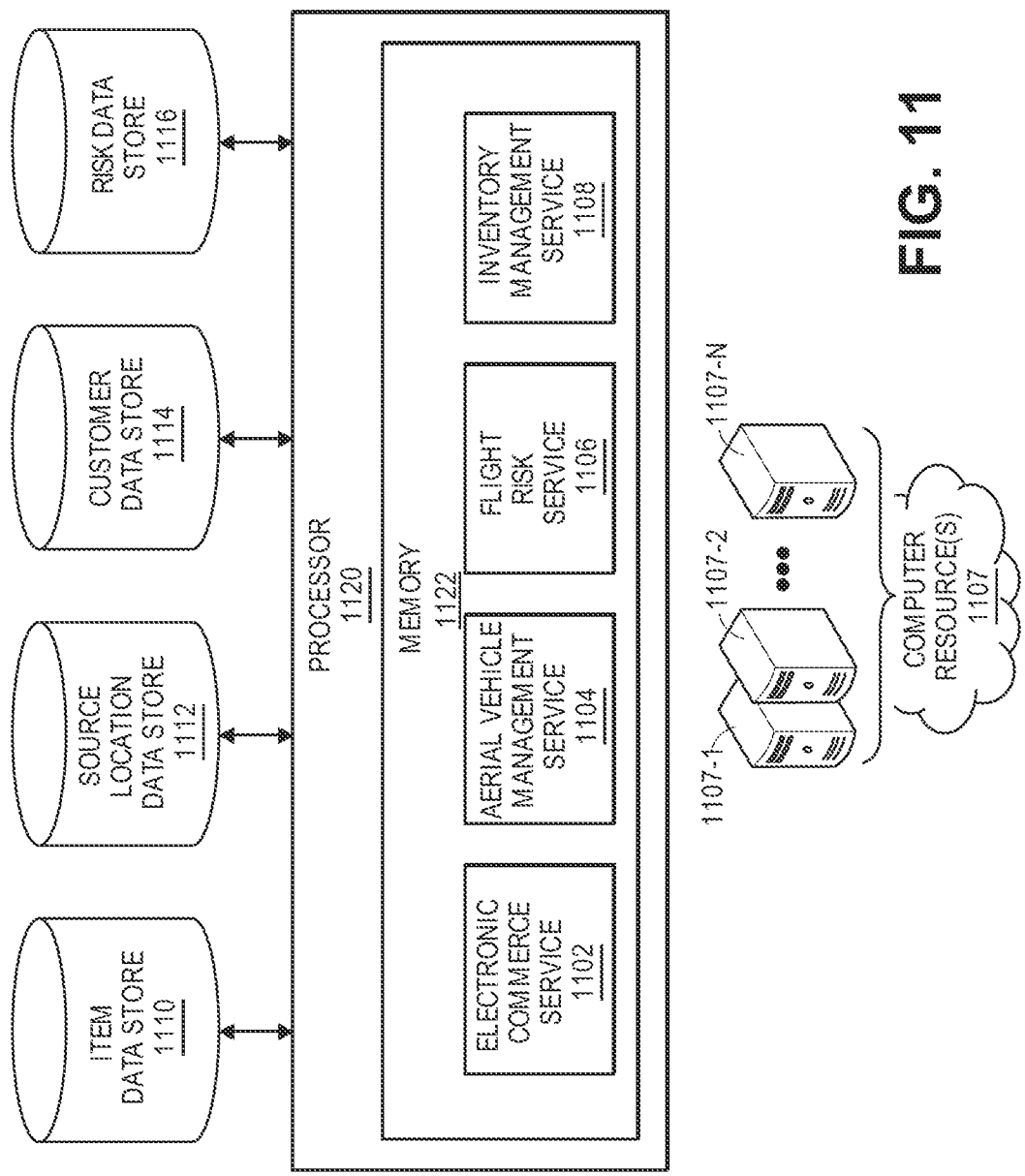
FIG. 11 is a block diagram of an exemplary system for managing flight operations, according to exemplary embodiments of the present disclosure.

FIG. 11 is a block diagram of components of one computing resource 1107 that may perform or provide the systems and methods, according to exemplary embodiments of the present disclosure. Computing resources 1107 may form a portion of a network-accessible computing platform implemented as a computing infrastructure of processors, storage, software, data access, and other components that is maintained and accessible via a network, such as the Internet. Services, such as electronic commerce service 1102, the aerial vehicle management service 1104, flight risk service 1106, and/or inventory management service 1108 enabled by the computing resources 1107, do not require that customers and/or other sellers have knowledge of the physical location and configuration of the computer resources 1107 that deliver the services. Customers may utilize one or more computing devices, such as computers, laptops, tablets, smartphones, and/or other hardware or software to communicatively couple to the computing resources 1107 via a network which may represent wired technologies (e.g., wires, USB, fiber optic cable, etc.), wireless technologies (e.g., RF, cellular, satellite, Bluetooth, etc.), and/or other connection technologies. Likewise, the aerial vehicles discussed herein may be configured or capable of communicating with the computing resources 1107 via a network.

As illustrated, the remote computing resources 1107 may include one or more servers, such as servers 1107-1, 1107-2, 1107-3 . . . 1107-N. These servers 1107-1-1107-N may be arranged in any number of ways, such as server farms, stacks, and the like, that are commonly used in data centers. Furthermore, the servers 1107-1-1107-N may include one or more processors 1120 and memory 1122 which may store the electronic commerce service 1102, aerial vehicle management service 1104, flight risk service 1106 and/or the inventory management service 1108 and execute one or more of the processes or features discussed herein.

The electronic commerce service 1102 may include one or more components that operate to perform one or more of the processes or features described herein. For example, the electronic commerce service 1102 may include and/or manage a website that includes multiple webpages that offer items for sale, lease, rental, borrowing, etc. Alternatively, or in addition thereto, the electronic commerce service 1102 may communicate with one or more of the aerial vehicle management service 1104, flight risk service 1106, and/or the inventory management service 1108 to facilitate one or more of the processes discussed herein.

The aerial vehicle management service 1104 may be configured to communicate with each of a plurality of aerial vehicles to coordinate flights of the aerial vehicles, plan flight paths of the aerial vehicles, schedule takeoffs and/or landings, instruct certain maneuvers, etc. The flight risk service 1106 may work in conjunction with the aerial vehicle management service 1104, and may determine a total risk associated with planned and current operational states, determine a total risk threshold, maintain the risk data store 1116, as discussed herein, etc. The inventory management service may communicate with each source location and maintain inventory information for each source location. One or more of the electronic commerce service 1102, the aerial vehicle management service 1104, the flight risk service 1106, and/or the inventory management service 1108 may also be configured to access one or more of the item data store 1110, source location data store 1112, customer data store 1114, and/or the risk data store 1116.

The item data store 1110 may store item information corresponding to items stored at various source locations. The item information may include, among other things, the dimensions of the items, the weight of the items, whether the item is eligible for item delivery, the fragility of the item, the source locations that maintain inventory of the item, etc. The source location data store 1112 may include information corresponding to each source location including, but not limited to, the inventory items maintained at the source location, the number, size, and/or configuration of aerial vehicles, such as unmanned aerial vehicles operating from the source location, the geographic position of the source location, etc. The customer data store 1114 may maintain information relevant to each customer, for example customers of the electronic commerce service 1102. Customer information may include one or more designated delivery destinations, default delivery destinations, preferred modes of delivery, purchase history, etc. The risk data store 1116 may store preferred flight paths, total risks associated with certain operations, concurrence risk lookup tables, weighted graphs representing the incremental total risk, etc.

As will be appreciated, additional or fewer components may be included in the example computer resources 1107 and the ones discussed herein are provided as examples and for discussion purposes only. For example, in some implementations, ordering service that manages customer orders may be included, and/or a payment service that manages payment for items requested by customers may be included in the computing resources 1107. Likewise, in other implementations, some or all of the components may be combined into a single component.

Figure 12:
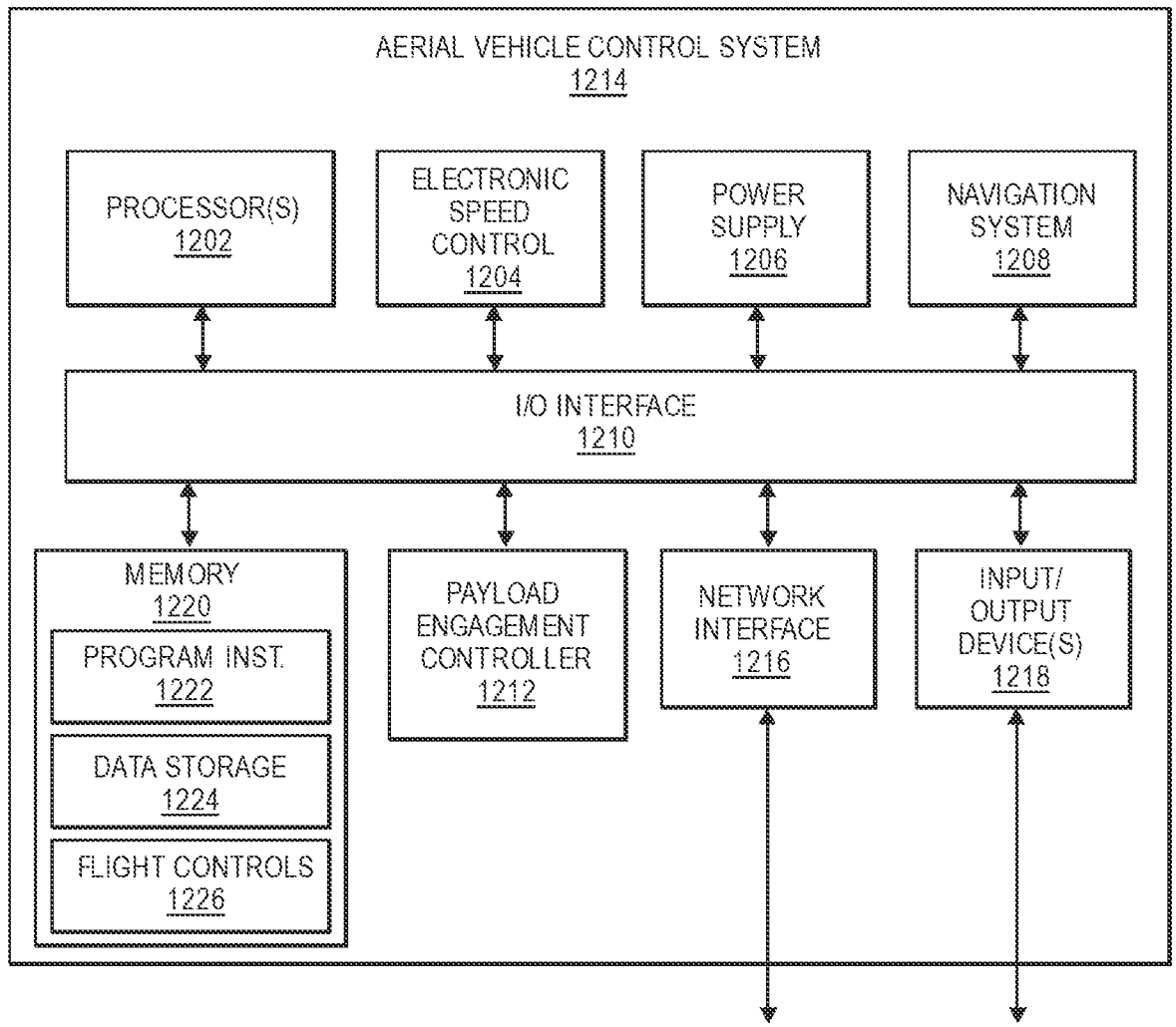
FIG. 12 is an exemplary aerial vehicle control system, according to exemplary embodiments of the present disclosure.

FIG. 12 is a block diagram illustrating an example aerial vehicle control system 1214, according to exemplary embodiments of the present disclosure. In various examples, the block diagram may be illustrative of one or more aspects of the aerial vehicle control system 1214 that may be used to implement the various systems and methods discussed herein and/or to control operation of the aerial vehicles described herein. In the illustrated implementation, the aerial vehicle control system 1214 includes one or more processors 1202, coupled to a memory, e.g., a non-transitory computer readable storage medium 1220, via an input/output (I/O) interface 1210. The aerial vehicle control system 1214 may also include electronic speed controls 1204 (ESCs), power supply modules 1206, a navigation system 1208, and/or a payload engagement controller 1212. In some implementations, the navigation system 1208 may include an inertial measurement unit (IMU). The aerial vehicle control system 1214 may also include a network interface 1216, and one or more input/output devices 1218.

In various implementations, the aerial vehicle control system 1214 may be a uniprocessor system including one processor 1202, or a multiprocessor system including several processors 1202 (e.g., two, four, eight, or another suitable number). The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium 1220 may be configured to store executable instructions, data, flight paths, flight control parameters, and/or data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1220 as program instructions 1222, data storage 1224 and flight controls 1226, respectively. In other implementations, program instructions, data, and/or flight controls may be received, sent, or stored upon different types of computer-accessible media, such as non-transitory media, or on similar media separate from the non-transitory computer readable storage medium 1220 or the aerial vehicle control system 1214. Generally speaking, a non-transitory, computer readable storage medium may include storage media or memory media such as magnetic or optical media, e.g., disk or CD/DVD-ROM, coupled to the aerial vehicle control system 1214 via the I/O interface 1210. Program instructions and data stored via a non-transitory computer readable storage medium may be transmitted by transmission media or signals, such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface 1216 or other peripheral interfaces, such as input/output devices 1218. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The ESCs 1204 communicate with the navigation system 1208 and adjust the rotational speed of each lifting motor and/or the thrusting motor to stabilize the aerial vehicle and guide the aerial vehicle along a determined flight path. The navigation system 1208 may include a GPS, indoor positioning system (IPS), IMU or other similar systems and/or sensors that can be used to navigate the aerial vehicle to and/or from a location. The payload engagement controller

1212 communicates with actuator(s) or motor(s) (e.g., a servo motor) used to engage and/or disengage items.

The network interface 1216 may be configured to allow data to be exchanged between the aerial vehicle control system 1214, other devices attached to a network, such as other computer systems (e.g., remote computing resources), and/or with aerial vehicle control systems of other aerial vehicles. For example, the network interface 1216 may enable wireless communication between the aerial vehicle that includes the aerial vehicle control system 1214 and an aerial vehicle control system that is implemented on one or more remote computing resources. For wireless communication, an antenna of an aerial vehicle or other communication components may be utilized. As another example, the network interface 1216 may enable wireless communication between numerous aerial vehicles. In various implementations, the network interface 1216 may support communication via wireless general data networks, such as a Wi-Fi network. For example, the network interface 1216 may support communication via telecommunications networks, such as cellular communication networks, satellite networks, and the like.

Input/output devices 1218 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 1218 may be present and controlled by the aerial vehicle control system 1214. One or more of these sensors may be utilized to assist in landing, avoid obstacles during flight, and/or to measure and record flight conditions during flight.

As shown in FIG. 12, the memory may include program instructions 1222, which may be configured to implement the example routines and/or sub-routines described herein. The data storage 1224 may include various data stores for maintaining data items that may be provided for determining flight paths, landing, identifying locations for disengaging items, engaging/disengaging the thrusting motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1214 is merely illustrative and is not intended to limit the scope of the present disclosure. In particular, the computing system and devices may include any combination of hardware or software that can perform the indicated functions. The aerial vehicle control system 1214 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

The computers, servers, devices, computing resources and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device or method to interact with the computers, servers, devices and the like, or to "select" a control, link, node, hub or any other aspect of the present disclosure.

Those of ordinary skill in the pertinent arts will understand that process steps described herein as being performed by an "electronic commerce service," an "aerial vehicle management service," a "flight risk service," an "inventory management service" or like terms, may be automated steps performed by their respective computer systems, or implemented within software modules (or computer programs) executed by one or more general purpose computers.

The data and/or computer executable instructions, programs, firmware, software and the like (also referred to herein as "computer executable" components) described herein may be stored on a computer-readable medium that is within or accessible by computers or computer components such as the computing resources 1107 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-8 and 10, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving a plurality of ground information associated with a plurality of missions to be performed by a plurality of aerial vehicles, wherein the plurality of ground information includes real-time ground information;
   receiving a plurality of vehicle information associated with the plurality of missions to be performed by the plurality of aerial vehicles, wherein the plurality of vehicle information includes real-time vehicle information;
   determining, based at least in part on the real-time ground information and the real-time vehicle information, a path risk associated with each of the plurality of missions performed by the plurality of aerial vehicles;
   determining a conformance volume probability distribution associated with each of the plurality of missions wherein the conformance volume probability distributions include a temporal expansion component;
   determining, for each pair of missions from the plurality of missions and based at least in part on the conformance volume probability distributions associated with the pair of missions, a pairwise concurrence risk distribution associated with each pair of missions;
   aggregating the path risks associated with each of the plurality of missions to obtain an aggregated path risk;
   projecting each of the pairwise concurrence risk distributions into a multi-dimensional space so as to aggregate the pairwise concurrence risk distribution associated with each pair of missions to obtain an aggregated concurrence risk, wherein a first number of dimensions associated with the multi-dimensional space corresponds to a second number of the plurality of aerial vehicles performing the plurality of missions; and
   determining a total concurrent risk associated with performing the plurality of missions based at least in part on the aggregated path risk and the aggregated concurrence risk.

2. The computer-implemented method of claim 1, further comprising:
   determining at least one solution in the multi-dimensional space, the at least one solution representing a point where none of the pairwise concurrence risk distributions overlap.

3. The computer-implemented method of claim 1, further comprising:
   determining a relative minima in the multi-dimensional space of the pairwise concurrence risk distributions;
   determining at least one conflict associated with the relative minima; and modifying at least one of the plurality of missions to resolve the at least one conflict.

4. The computer-implemented method of claim 1, wherein the path risk includes a ground risk and a vehicle risk.

5. A computing system, comprising:
one or more processors;
a memory coupled to the one or more processors and storing program instructions that, when executed by the one or more processors, cause the one or more processors to at least:
determine a first conformance volume distribution associated with a first mission performed by a first aerial vehicle wherein the first conformance volume distribution includes a first temporal expansion component;
determine a second conformance volume distribution associated with a second mission performed by a second aerial vehicle wherein the second conformance volume distribution includes a second temporal expansion component;
determine a first pairwise concurrence risk distribution associated with the first mission and the second mission based at least in part on the first conformance volume distribution and the second conformance volume distribution;
determine, based at least in part on first real-time ground information and first real-time vehicle information, a first path risk associated with the first mission performed by the first aerial vehicle;
determine, based at least in part on second real-time ground information and second real-time vehicle information, a second path risk associated with the second mission performed by the second aerial vehicle; and
aggregate the first path risk and the second path risk to determine a total concurrent risk associated with performing the first mission and the second mission.

6. The computing system of claim 5, wherein the program instructions further cause the one or more processors to at least:
modify at least one of the first mission or the second mission based at least in part on the first pairwise conformance risk distribution; and
determine at least one of a revised first pairwise concurrence risk, a revised first path risk, or a revised second path risk based at least in part on a modification of at least one of the first mission or the second mission.

7. The computing system of claim 6, wherein the program instructions further cause the one or more processors to at least:
determine the total concurrent risk based at least in part on at least one of the revised first pairwise concurrence risk, the revised first path risk, or the revised second path risk in view of the modification of at least one of the first mission or the second mission.

8. The computing system of claim 5, wherein the program instructions further cause the one or more processors to at least:
modify at least one of the first mission or the second mission based at least in part on the first pairwise conformance risk distribution,
wherein modifying at least one of the first mission or the second mission includes modifying at least one of:
a first path associated with the first mission;
a second path associated with the second mission;
a first takeoff time associated with the first mission; or
a second takeoff time associated with the second mission.

9. The computing system of claim 5, wherein determination of the first pairwise concurrence risk includes, at least:
determining a relative state of the first aerial vehicle relative to the second aerial vehicle at a first time; and
accessing a lookup table to determine the first pairwise concurrence risk distribution based at least in part on the relative state of the first aerial vehicle relative to the second aerial vehicle at the first time.

10. The computing system of claim 9, wherein the relative state includes a relative position of the first aerial vehicle relative to the second aerial vehicle and a relative velocity of the first aerial vehicle relative to the second aerial vehicle.

11. The computing system of claim 5, wherein the program instructions further cause the one or more processors to at least:
determine a third conformance volume distribution associated with a third mission performed by a third aerial vehicle;
determine a second pairwise concurrence risk distribution associated with the first mission and the third mission based at least in part on the first conformance volume distribution and the third conformance volume distribution; and
determine a third pairwise concurrence risk distribution associated with the second mission and the third mission based at least in part on the second conformance volume distribution and the third conformance volume distribution.

12. The computing system of claim 11, wherein the program instructions further cause the one or more processors to at least:
project the first pairwise concurrence risk distribution, the second pairwise concurrence risk distribution, and the third pairwise concurrence risk distribution into a multi-dimensional space; and
determine at least one solution in the multi-dimensional space, the at least one solution representing a point where none of the first pairwise concurrence risk distribution, the second pairwise concurrence risk distribution, and the third pairwise concurrence risk distribution overlap.

13. The computing system of claim 11, wherein the program instructions further cause the one or more processors to at least:
project the first pairwise concurrence risk distribution, the second pairwise concurrence risk distribution, and the third pairwise concurrence risk distribution into a multi-dimensional space;
determine a relative minima in the multi-dimensional space of the first pairwise concurrence risk distribution, the second pairwise concurrence risk distribution, and the third pairwise concurrence risk distribution;
determine at least one conflict associated with the relative minima; and
modify at least one of the first mission, the second mission, or the third mission to resolve the at least one conflict.

14. The computing system of claim 5, wherein the first pairwise concurrence risk distribution is based at least in part on a difference between a first takeoff time associated with the first mission and a second takeoff time associated with the second mission.

15. A computer-implemented method, comprising:
- receiving a request from a client device in connection with an item offered on an electronic commerce platform;
- obtaining a delivery destination corresponding to a user associated with the client device;
- determining a source location associated with the item;
- determining a total risk associated with current mission operations including a plurality of current missions being performed by a plurality of aerial vehicles;
- determining, based at least in part on real-time ground information and real-time vehicle information, an incremental risk of performing a mission to deliver, via an aerial vehicle, the item from the source location to the delivery destination;
- determining a predicted total risk based at least in part on the total risk and the incremental risk wherein the predicted total risk is determined based at least in part on conformance volume probability distributions associated with the mission and the plurality of current missions that include a temporal expansion component;
- determining that the predicted total risk is below a threshold risk; and
- sending, for presentation on the client device, an aerial delivery option in connection with the item.

16. The computer-implemented method of claim 15, wherein determining the incremental risk includes at least:
- determining a path risk associated with the mission; and
- determining a concurrence risk associated with the mission.

17. The computer-implemented method of claim 16, wherein determining the concurrence risk includes:
- determining the conformance volume probability distribution associated with the mission and the plurality of current missions;
and
- determining, in connection with the plurality of current missions a pairwise concurrence risk distribution associated with the mission based at least in part on the conformance volume probability distributions associated with the mission and the plurality of current missions.

18. The computer-implemented method of claim 15, further comprising:
- initiating an aerial delivery of the item from the source location to the delivery destination.

19. The computer-implemented method of claim 15, further comprising:
- determining at least one time period associated with the predicted total risk; and
- sending, for presentation on the client device, an indication that aerial delivery is available during the at least one time period.

* * * * *